United States Patent
Lombardi

(10) Patent No.: US 10,124,368 B2
(45) Date of Patent: Nov. 13, 2018

(54) COMPOSITIONS PROMOTING THE ACCELERATED DEGRADATION OF METALS AND COMPOSITE MATERIALS

(71) Applicant: John L. Lombardi, Tucson, AZ (US)

(72) Inventor: John L. Lombardi, Tucson, AZ (US)

(*) Notice: Subject to any disclaimer, the term of this patent is extended or adjusted under 35 U.S.C. 154(b) by 506 days.

(21) Appl. No.: 14/716,688

(22) Filed: May 19, 2015

(65) Prior Publication Data

US 2015/0360257 A1    Dec. 17, 2015

Related U.S. Application Data

(62) Division of application No. 13/183,382, filed on Jul. 14, 2011, now Pat. No. 9,034,117.

(60) Provisional application No. 61/364,342, filed on Jul. 14, 2010.

(51) Int. Cl.
| | | |
|---|---|---|
| C08K 3/00 | (2018.01) | |
| C08G 12/32 | (2006.01) | |
| B05D 3/10 | (2006.01) | |
| C09J 4/06 | (2006.01) | |
| B05D 7/14 | (2006.01) | |
| C09K 3/00 | (2006.01) | |
| C23C 8/00 | (2006.01) | |
| F41H 13/00 | (2006.01) | |
| C09D 7/61 | (2018.01) | |
| C23C 22/00 | (2006.01) | |
| C08K 3/16 | (2006.01) | |
| C08K 5/17 | (2006.01) | |
| C08K 3/30 | (2006.01) | |

(52) U.S. Cl.
CPC ............... *B05D 3/107* (2013.01); *B05D 7/14* (2013.01); *C08G 12/32* (2013.01); *C09D 7/61* (2018.01); *C09J 4/06* (2013.01); *C09K 3/00* (2013.01); *C23C 8/00* (2013.01); *F41H 13/00* (2013.01); *C08K 3/16* (2013.01); *C08K 5/17* (2013.01); *C08K 2003/3045* (2013.01)

(58) Field of Classification Search
CPC .......... C09D 7/1216; C09J 4/06; C28G 12/32; C08K 3/16; C08K 2003/3045; C08K 5/17
USPC ................ 252/186.25, 186.21; 148/251, 274
See application file for complete search history.

(56) References Cited

U.S. PATENT DOCUMENTS 7,131,493 B2    11/2006  Eoff et al.
7,205,067 B2     4/2007  Godevals et al.

*Primary Examiner* — Lois L Zheng
(74) *Attorney, Agent, or Firm* — Dale F. Regelman; Grossman, Tucker, Perreault & Pfleger, PLLC

(57) ABSTRACT

A composition to decommission firearms is presented. The composition comprises a monomer, a quantity of calcium chloride; and sulfur-containing compound. The sulfur containing compound includes sodium persulfate and/or sodium thiosulfate.

13 Claims, 20 Drawing Sheets

COMPOSITIONS PROMOTING THE ACCELERATED DEGRADATION OF METALS AND COMPOSITE MATERIALS

RELATED APPLICATIONS

This application is a Divisional Application claiming priority from U.S. Nonprovisional Application having Ser. No. 13/183,382 filed Jul. 14, 2011, now U.S. Pat. No. 9,034,117, which claimed priority from U.S. Provisional Application having Ser. No. 61/364,342 filed Jul. 14, 2010, which is incorporated by reference herein.

GOVERNMENT LICENSE RIGHTS

This invention was made with government support under Grant Number W31P4Q-08-C-0291 awarded by the Defense Advanced Research Projects Agency. The government has certain rights in the invention.

FIELD OF THE INVENTION

The invention relates to compositions that degrade and weaken metals, metal alloys, and composite materials.

BACKGROUND OF THE INVENTION

The effective destruction of small arms is a growing concern, particularly for military and civilian law enforcement organizations. Small arms, such as handguns, rifles, and shotguns are routinely seized by civilian law enforcement organizations, often as part of criminal investigations. In addition, military forces often encounter large enemy caches of small arms, including automatic weapons and other battlefield arms. The continued existence of these small arms poses a continued threat to the extent that they may fall back into enemy or criminal hands.

In order to mitigate the risk posed by confiscated arms falling back into unwanted hands, many military and law enforcement operations employ various methods to incapacitate and destroy the arms to permanently render them inoperable. One method of destruction involves placing the arms on a hard surface, such as a concrete road, and driving over the arms with a large vehicle. As the tires contact the arms, the weight of the vehicle bends and distorts the barrels of the arms. This method generally works for rifles, shotguns and other long arms, but is not as effective for handguns and other smaller arms. Also, while this method effectively destroys the barrel, the other parts of the weapon are generally undamaged. Additionally, since the barrels on many types of arms can be easily replaced, this method is likely to leave some weapons in operable condition. As such, the effectiveness of this method is limited.

Another method, involves plugging the barrel and other internal cavities of the weapon with a filler material, such as concrete, thus rendering the weapon inoperative. The filler material, however, is generally less sturdy as compared to the weapon itself and can be chipped or burned out to restore the functionality of the weapon. Yet another method involves inserting and detonating an explosive in the barrel of the weapon. The explosion splits and distorts the barrel, rendering the weapon inoperative. As mentioned above, however, the barrel on many arms can be easily replaced, thereby restoring the weapon's functionality. Additionally, this method is very time intensive, because it must be applied to each weapon individually. It is also dangerous, as is generally the case when dealing with explosives. Other methods involve cutting, sawing, smelting, and fully encapsulating the weapons in concrete. As such, current methods for incapacitating and destroying small arms are time intensive, resource intensive, energy intensive, dangerous, or may not be permanent.

Accordingly, it would be an advance in the state of the art to provide a chemical formulation, along with a method and apparatus for applying such formulation, wherein the formulation is (i) non-toxic, (ii) made from inexpensive, non-toxic, and readily available components, (iii) capable of being easily applied to a cache of small arms or other types of metal, (iv) capable of rendering small arms inoperable after application, (v) capable of degrading metal within a short time frame so as to permanently render small arms inoperable or otherwise structurally weaken metal such that it will likely fail when used for its intended purpose, and/or (vi) capable of hardening into a resin that can maintain its structural integrity at temperatures exceeding that with would substantially diminish the integrity of metal.

SUMMARY OF THE INVENTION

A composition to decommission firearms is presented. The composition comprises a monomer, a quantity of calcium chloride; and sulfur-containing compound. The sulfur containing compound includes sodium persulfate and/or sodium thiosulfate, and combinations thereof.

In addition, a foaming composition to render electrical components inoperable is presented. The composition comprises a foaming agent, a corrosion promoter; and a quantity of sodium persulfate.

In addition, a method of making a composition to decommission firearms is presented. The method combines a monomer, a quantity of calcium chloride, and a sulfur-containing compound. The sulfur-containing compound includes sodium persulfate and/or sodium thiosulfate. The sulfur-containing compound catalyzes the polymerization of said monomer.

DETAILED DESCRIPTION OF THE PREFERRED EMBODIMENTS

Figure 1:
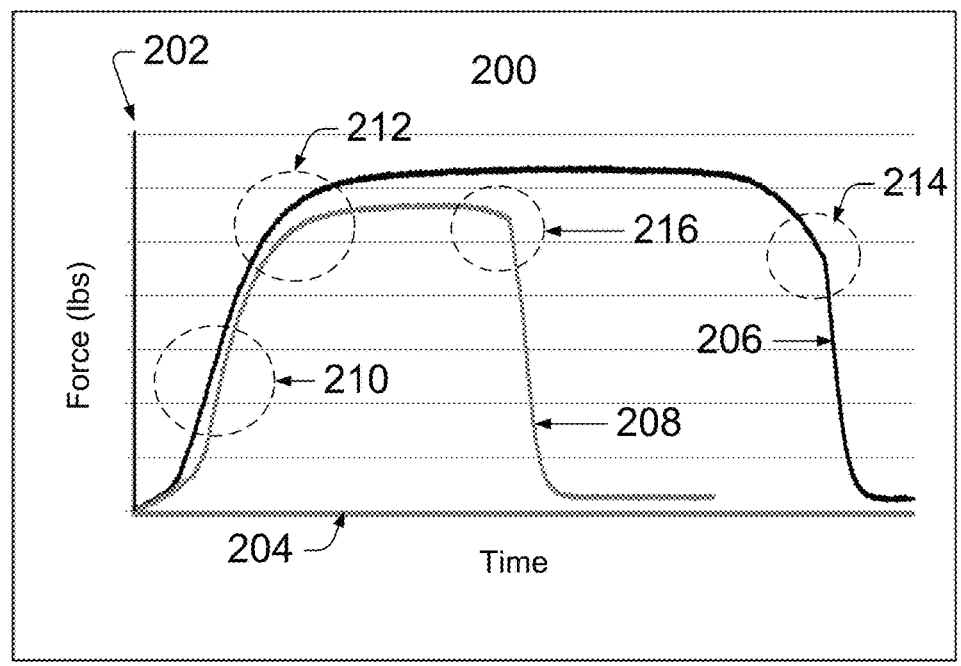
FIG. 1 is a strain plot for steel samples treated for 24 hours with one embodiment of Applicant's sprayable disarmament resin.

In one embodiment, Applicant's composition comprises a non-toxic chemical formulation for a more convenient, safe, and permanent means of weakening and destroying metal (both ferrous and non-ferrous) and composite materials than those that currently exist. Applicant's composition, in different embodiments, is available as a sprayable liquid, a dispensable paste, and a foamable, formulation. In certain embodiments, Applicant's composition comprises two components, which cure within a few minutes after mixing to form a tough, rigid thermoset resin. In certain embodiments, Applicant's composition comprises two components, which cure within a few minutes after mixing to form a flexible resin.

In one embodiment of Applicant's method, Applicant's composition is used for incapacitation and destruction of caches of small arms. Using the dispensable embodiment, a thermoset polymer immediately cements and binds firearm barrels and actions, as well as corroding and embrittling metal surfaces to significantly reduce the strength and ductility of the metal. Applicant's composition is able to penetrate and effectively degrade firearms even if their surfaces have been pre-coated with a lubricant/corrosion inhibitor, such as Cosmoline. Applicant's composition renders the weapons inoperable by hardening within one or more internal cavities and/or corroding and weakening metal elements of the weapons.

In another embodiment of Applicant's method, Applicant's composition is applied to one or more portions of a suspension system for a vehicle, such as and without limitation a car, truck or other military vehicle. After application, Applicant's composition corrodes and embrittles the affected part, such as for example and without limitation a coil or leaf spring thereby causing the spring to fail during use. This embodiment enables soldiers or law enforcement personal to effectively and discretely disable vehicles by destroying the suspension system, but without inflicting significant damage to the other parts of the vehicle.

In yet another embodiment of Applicant's method, Applicant's composition is applied to electronics systems, including circuit boards, hard disk storage devices, tape storage devices, electronic storage device, and the like. After application, Applicant's composition corrodes and embrittles metal and/or ceramic elements of the contacted device thereby rendering the device inoperable.

Applicant's composition degrades metals and other materials via an electrolytic pitting corrosion mechanism. In addition, in certain embodiments Applicant's composition comprises sulfurous compounds which promote hydrogen embrittlement within steel surfaces. Hydrogen is a byproduct of corrosion and electrochemical process in an aqueous environment. During an electrochemical process, hydrogen ions (H+) combine with electrons to form atomic hydrogen on the surface of a material, such as for example a steel surface of a firearm component.

Depending on the environment and interfacial properties, the atomic hydrogen formed may recombine to form molecular hydrogen. However, in the presence of sulfur compounds, the hydrogen recombination to molecular hydrogen process is poisoned, and atomic hydrogen instead rapidly permeates into the steel surface causing cracking, embrittlement and ductility loss within the metal. By virtue of its small size, atomic hydrogen readily permeates through layers of gun oil, lubricants, or other corrosion prevention materials, which are commonly used to protect steel from environmental corrosive.

In various embodiments, applicant's composition is a waterborne sprayable liquid, a dispensable gel, or a foamable liquid. In some embodiments, the composition cures to form a rigid resin upon application. In some embodiments, the composition cures to form a flexible resin upon application. The cured resins induce significant surface pitting and embrittlement in treated steel leading to delamination, surface cracks, and brittle factures and causing to rapid reduction in steel tensile strength and elongation-to-break values.

In certain embodiments, Applicant's composition comprises a monomer I that can be polymerized using a chain-growth mechanism to form oligomers and polymers. In certain embodiments, Applicant's composition comprises one or more monomers I, wherein R1 is selected from the group consisting of —N(R3)(R4), —CO—O—R3, —CO—OH, phenyl, and benzyl, and wherein R2 is selected from the group consisting of hydrogen, alkyl, alkenyl, phenyl, and benzyl.

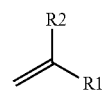

I

In certain embodiments, Applicant's composition comprises one or more substituted acrylamide monomers II, wherein at least one of the substituted acrylamide monomers is water soluble.

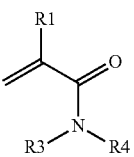

In certain embodiments, Applicant's composition comprises 2-Acrylamido-2-methylpropane sulfonic acid. In certain embodiments, Applicant's composition comprises 2-Acrlamido-2-methylpropane sulfonic acid salt III. In certain embodiments, Applicant's composition comprises 2-Acrylamido-2-methylpropane sulfonic acid salt III wherein $M^+$ is $Na^+$ or $Ca^+$. 2-Acrylamido-2-methylpropane sulfonic polymer has a conductivity of 0.02-0.11 s·cm$^{-1}$.

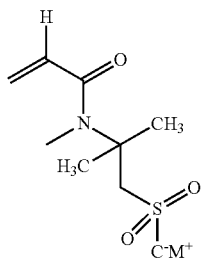

In certain embodiments, Applicant's composition comprises one or more substituted N-vinyl pyrrolidones IV.

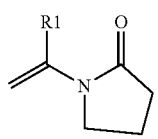

In certain embodiments, Applicant's composition comprises a 2-alkyl-oxazoline V (wherein alkyl is ethyl). Using Applicant's method, monomer V is polymerized to form a plurality of substituted polyethyleneimine oligomers/polymers VI.

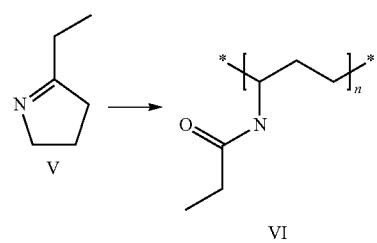

In certain embodiments, Applicant's composition comprises a cross-linking agent, such as and without limitation, N,N'-methylene bis-acrylamide VII.

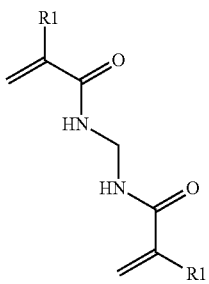

In certain embodiments, applicant's dispensable gel composition is a non-Newtonian fluid with a shear thinning paste rheology. This gel composition can be dispensed and disposed into firearms barrels and actions. The resin formed comprises a condensate between melamine VIII, glyoxal, IX, and acrylamide X. This formulation polymerizes to a very hard thermoset product exhibiting high compressive strength. This formulation is well suited for plugging the firing action and barrels of seized small arms.

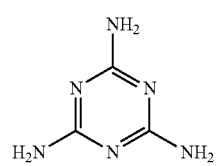

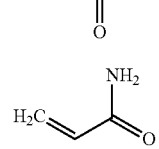

The following Examples are presented to further illustrate to persons skilled in the art how to make and use the invention. These Examples are not intended as a limitation, however, upon the scope of Applicant's invention.

EXAMPLE 1

In one embodiment, Applicant's composition having an about 64/1 weight percentage ratio monomer/cross-linking agent is prepared using the components in Table 1.

TABLE 1

| Part | Component | Function | Concentration (wt %) |
|---|---|---|---|
| A | Monomer III, Sodium Salt | Resin Monomer | 14.13 |
|  | N-N' methylene-bisacrylamide | Resin Crosslinking Agent | 0.22 |
|  | CaCl$_2$ (Calcium Chloride) | Corrosion/Pitting Promoter | 8.26 |
|  | Na$_2$S$_2$O$_3$ (Sodium Thiosulfate) | Redox Free Radical Promoter, Corrosion/Hydrogen | 3.59 |

TABLE 1-continued

| Part | Component | Function | Concentration (wt %) |
|---|---|---|---|
| B | $Na_2S_2O_8$ (Sodium Persulfate) | Embrittlement Promoter Free Radical Polymerization agent- Resin Gelation Initiator, Corrosion Promoter | 5.22 |
| — | $H_2O$ (water) | Resin Solvent | 68.58 |
|  | TOTAL |  | 100.00 |

Part A is an aqueous solution prepared by combining a portion of the water, 2-Acrylamido-2-methylpropane sulfonic acid/sodium salt monomer (sold in commerce by Lubrizol as AMPS-2405), N-N' methylenebisacrylamide cross-linking agent (sold in commerce by Alfa Aesar), calcium chloride prills (sold in commerce by Hill Brothers Chemical Co.), and anhydrous sodium thiosulfate (photo grade quality sold in commerce by CCI).

Part B is an aqueous solution prepared by combining a portion of the water with sodium persulfate (sold in commerce by FMC Industrial Chemicals).

Just prior to application, the Part A and Part B components are combined to form a low viscosity liquid (less than 20 cP), which is broadcast onto a target cache of weapons, vehicle suspension system, electronic circuitry, or other suitable target. The liquid will cure to a flexible resin within a short period of time.

EXAMPLE 2

In one embodiment, Applicant's composition having an about 33/1 weight percentage ratio monomer/cross-linking agent is prepared using the components in Table 2. This embodiment results in a flexible resin when cured. The resin of Example 2 is somewhat softer than the resin of Example 1 due to higher ratio of monomer/cross-linker in the Example 1 formulation.

TABLE 2

| Part | Component | Function | Concentration (wt %) |
|---|---|---|---|
| A | Monomer III, Sodium Salt | Resin Monomer | 8.24 |
|  | N-N' methylene-bisacrylamide | Resin Crosslinking Agent | 0.25 |
|  | $CaCl_2$ | Corrosion/Pitting Promoter | 15.12 |
|  | $Na_2S_2O_3$ (Sodium Thiosulfate) | Redox Free Radical Promoter, Corrosion/Hydrogen Embrittlement Promoter | 4.53 |
| B | $Na_2S_2O_8$ (Sodium Persulfate) | Free Radical Polymerization agent- Resin Gelation Initiator, Corrosion Promoter | 6.52 |
| — | $H_2O$ (water) | Resin Solvent | 65.34 |
|  | TOTAL |  | 100.00 |

Part A is an aqueous solution prepared by combining a portion of the water, the 2-Acrylamido-2-methylpropane sulfonic acid/sodium salt monomer (sold in commerce by Lubrizol as AMPS-2405), the N-N' methylenebisacrylamide crosslinking agent (sold in commerce by Alfa Aesar), calcium chloride prills (sold in commerce by Hill Brothers Chemical Co.), and the anhydrous sodium thiosulfate (photo grade quality sold in commerce by CCI).

Part B is an aqueous solution prepared by combining a portion of the water with sodium persulfate (sold in commerce by FMC Industrial Chemicals).

Just prior to application, the Part A and Part B components are combined to form a low viscosity liquid (less than 20 cP), which is broadcast onto a target cache of weapons, vehicle suspension system, electronic circuitry, or other suitable target. The liquid will cure to a flexible resin within a short period of time.

EXAMPLE 3

In one embodiment, Applicant's dispensable gel disarmament resin composition is prepared using the components in Table 3. This embodiment results in a rigid resin when cured.

TABLE 3

| Part | Component | Function | Concentration (wt %) |
|---|---|---|---|
| A | Melamine VIII-glyoxal IX-acrylamide X Condensate Product | Resin Oligomer | 19.70 |
|  | $CaCl_2$ | Corrosion/Pitting Promoter | 6.42 |
|  | $Na_2S_2O_3$ (Sodium Thiosulfate) | Redox Free Radical Promoter, Corrosion/Hydrogen Embrittlement Promoter | 4.93 |
| B | $Na_2S_2O_8$ (Sodium Persulfate) | Free Radical Polymerization agent- Resin Gelation Initiator, Corrosion Promoter | 9.13 |
| — | $H_2O$ (water) | Resin Solvent | 59.82 |
|  | TOTAL |  | 100.00 |

Figure 15:
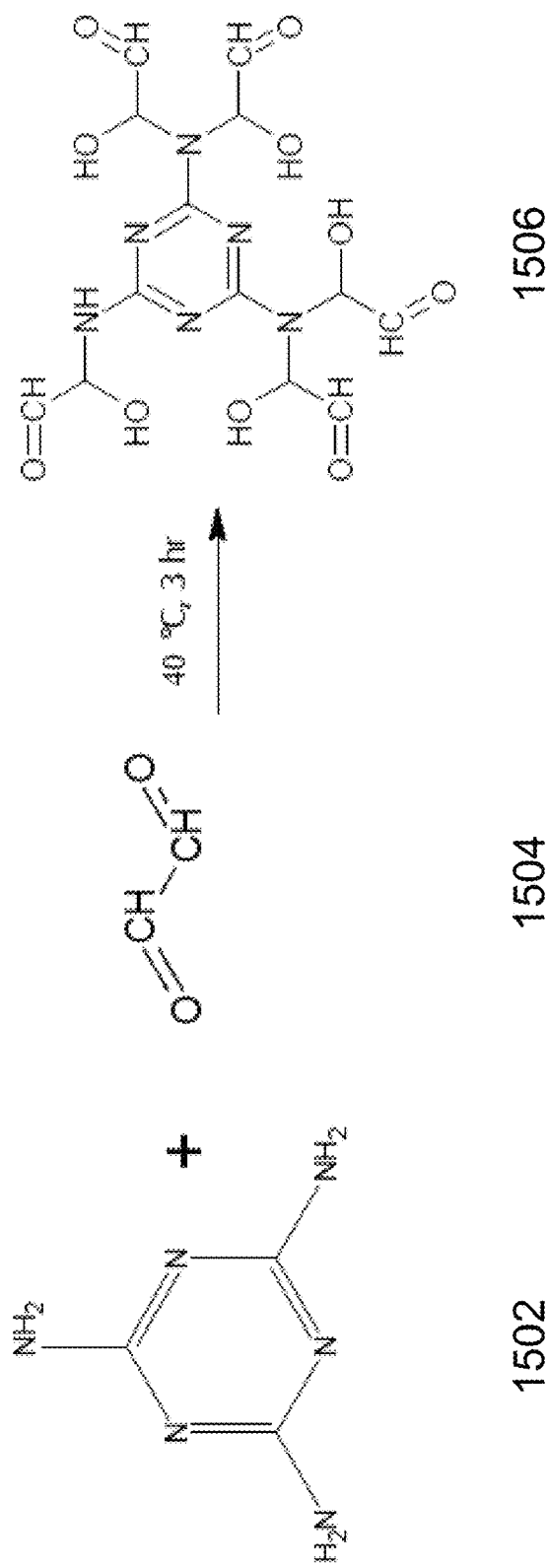
FIGS. 15 and 16 show the chemistry involved in creating the melamine-glyoxal-acrylamide condensate product used in certain embodiments of Applicant's disarmament resin.

The melamine-glyoxal-acrylamide condensation product is synthesized from 322.14 g of glyoxal (40%), sold in commerce by Alfa Aeser, weighed into a 1000 mL polyethylene bottle large stir bar and then about 85% of the total water amount (144.88*0.85=123.12 g) is added into the bottle. The glyoxal solution is heated to 40° C. Approximately 4-5 g of melamine, sold in commerce by Sigma-Aldrich, is added into the glyoxal solution every two minutes over a period of 20 minutes. The final amount of melamine in the solution is 50.00 g. The reaction is allowed to proceed for 3 hours at 40° C. Referring to FIG. 15, the reaction between melamine 1502 and glyoxal to form product 1506. The melamine-glyoxal-acrylamide condensation product is then copolymerized with 2-acrylamido-2-methylpropane sulfonic acid salt via radical chain polymerization to form a highly crosslinked polymer.

Figure 16:
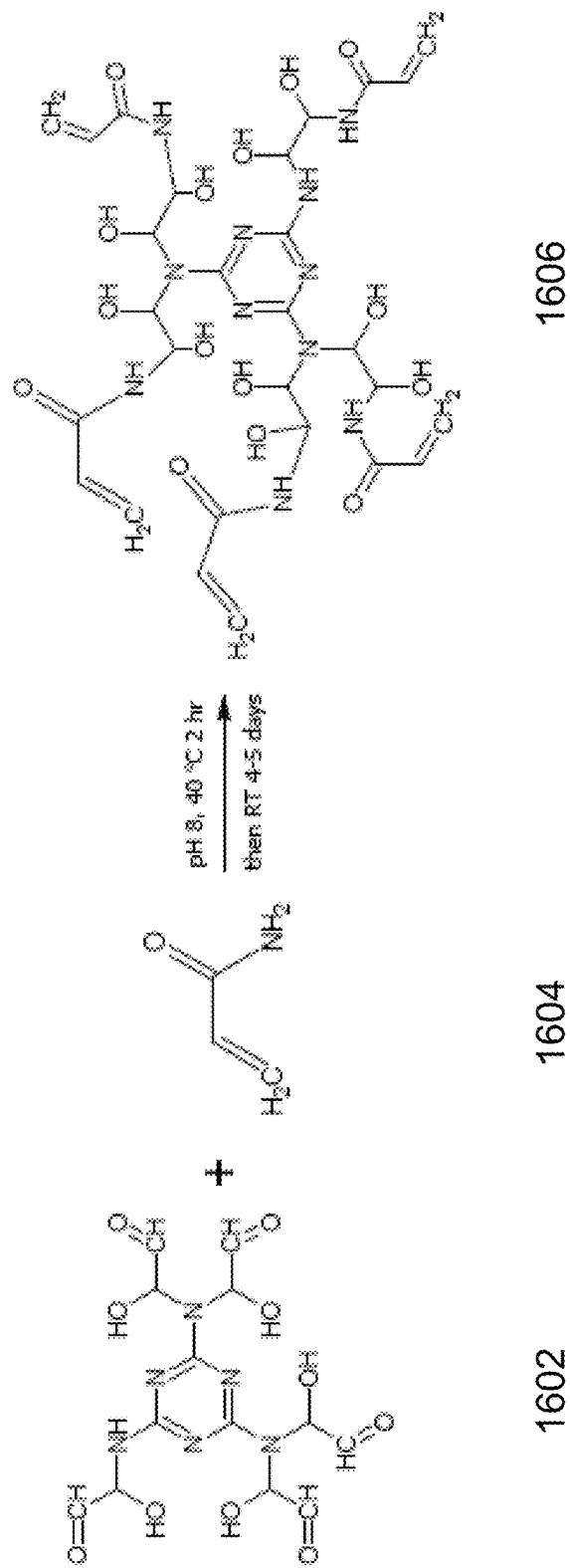

Next, 263.01 g of 60% acrylamide solution, sold in commerce by Alfa Aesar, is added to the reaction mixture while stirring. The pH is then adjusted to 8.00 using 10% sodium carbonate solution. The reaction is allowed to proceed for another 2 hours at 40° C., then the pH is adjusted to pH 7.5 if necessary using 10% sodium carbonate solution. Referring to FIG. 16, the reaction between the melamine/glyoxal product 1602 and acrylamide 1604 to form the condensate product 1606.

The remaining 15% of the total water amount is then added into the reaction. Finally, the heat is removed and the solution stirred for another 4-5 days. The solid content, from such prepared melamine-glyoxal-acrylamide condensate solution, will be approximately 43.2% weight percent.

Part A is an aqueous solution prepared by combining a portion of the water, the melamine-glyoxal-acrylamide condensation product, calcium chloride prills and the sodium thiosulfate.

Part B is an aqueous solution prepared by combining a portion of the water with sodium persulfate.

Just prior to application, the Part A and Part B components are combined to form gel, which is applied onto a target cache of weapons, vehicle suspension system, electronic circuitry, or other suitable target. The gel will cure to a rigid resin within a short period of time.

In some embodiments, the quantity of the melamine-glyoxal-acrylamide condensation product is between about 40 dry weight percent and about 60 dry weight percent of the combined Part A and Part B components in Table 3. In some embodiments, the quantity of sodium chloride is between about 10 dry weight percent and about 20 dry weight percent of the combined Part A and Part B components in Table 3. In some embodiments, the quantity of the sodium thiosulfate is between about 5 dry weight percent and about 15 dry weight percent of the combined Part A and Part B components in Table 3. In some embodiments, the quantity of the sodium persulfate is between about 20 dry weight percent and about 30 weight percent of the combined Part A and Part B components in Table 3. In some embodiments, the total quantity of water used to create the aqueous Part A component and the aqueous Part B component is between about 50 weight percent and about 75 weight percent of the total components in Table 3.

EXAMPLE 4

In one embodiment, Applicant's dispensable liquid disarmament resin composition is prepared using the components in Table 4. This embodiment results in a rigid resin when cured.

TABLE 4

| Part | Component | Function | Concentration (wt %) |
|---|---|---|---|
| A | Melamine VIII-glyoxal IX-acrylamide X Condensate Product | Resin Oligomer | 9.45 |
|  | Monomer III, Sodium Salt | Resin Co-monomer | 5.50 |
|  | $CaCl_2$ | Corrosion/Pitting Promoter | 13.56 |
|  | $Na_2S_2O_3$ (Sodium Thiosulfate) | Redox Free Radical Promoter, Corrosion/Hydrogen Embrittlement Promoter | 4.53 |
| B | $Na_2S_2O_8$ (Sodium Persulfate) | Free Radical Polymerization agent - Resin Gelation Initiator, Corrosion Promoter | 6.53 |
| — | $H_2O$ (water) | Resin Solvent | 60.43 |
|  | TOTAL |  | 100.00 |

The melamine-glyoxal-acrylamide condensation product is synthesized in the same manner as in Example 3 above.

Part A is an aqueous solution prepared by combining a portion of the water, the melamine-glyoxal-acrylamide condensation product, the 2-Acrylamido-2-methylpropane sulfonic acid/sodium salt monomer, calcium chloride prills and the sodium thiosulfate.

Part B is an aqueous solution prepared by combining a portion of the water with sodium persulfate.

Just prior to application, the Part A and Part B components are combined to form a low viscosity liquid (less than 20 cP), which is broadcast onto a target cache of weapons, vehicle suspension system, electronic circuitry, or other suitable target. The liquid will cure to a rigid resin within a short period of time.

Other Embodiments

In different embodiments, Applicant's composition comprises copper or graphite powder to further promote corrosion induced by galvanic current (i.e., a galvanic current enhancer). In different embodiments, the copper powder is grade 161 or 301-E, sold in commerce by ACuPowder. In one embodiment, the graphite powder is grade A60 synthetic graphite, sold in commerce by Asbury Carbons. In different embodiments, Applicant's composition comprises less than 1 weight percent copper or graphite powder, between about 1 weight percent and about 2 weight percent copper or graphite powder, between about 2 weight percent and about 5 weight percent copper or graphite powder, or greater than about 5 weight percent.

In certain embodiments, the formulations in Examples 1-4 utilize ammonium persulfate and/or potassium persulfate in place of sodium persulfate. In these embodiments, the amounts of sodium persulfate/ammonium persulfate/potassium persulfate are adjusted to give the same molar equivalents of total persulfate as recited in Tables 1-4, respectively.

In certain embodiments, the Part A mixture of Examples 1-4 is prepared without water (i.e., only the dry components are combined) and the Part B component of Examples 1-4 is also prepared without water. The dry and light weight Part A and Part B components can be easily shipped or otherwise transported as necessary. Water is then added on-site to form the aqueous Part A and Part B components. In one embodiment, 25 mL of water is added to the dry Part A mixture to form the aqueous Part A component and 43 mL of water is added to the dry Part B component to form the aqueous Part B component. Just prior to application, the aqueous Part A component and aqueous Part B component are mixed together, and the mixture broadcast onto a target cache of weapons, vehicle suspension system, electronic circuitry, and the like.

The mixing may occur in an applicator device. In one embodiment of the applicator, the applicator contains a chamber for the Part A component and a separate chamber for the Part B component. Liquid streams of the Part A and Part B components are forced together in a manner to allow sufficient mixing before exiting the device.

The only regulated component of Tables 1-4 is sodium persulfate ($Na_2S_2O_8$), which is regulated by the US Department of Transportation for transportation. The embodiments in Examples 1-4 do not contain any acidic components. Acid is instead generated in-situ via steel/persulfate corrosion reactions.

Test Results

Test samples comprising 4130 steel wire rod, cut into 4 inch lengths with a prepared gauge length of 1.25 inches including a diminished diameter cross-section in the center of the rod were used to evaluate the formulations of Tables 1 and 2. The prepared gauge length diminished/reduced diameter section has a diameter of 0.06 (+/−0.001) inches and is produced by rotational milling of the rod at approx.

3000 rpm with 200 grit Emery Cloth and finished with a 440 grit silicon carbide abrasive (as per ASTM E 8/E 8-08, Standard Test Methods for Tension Testing of Metallic Materials). The surface area to volume ratio (S/V) of the 4140 wire is 67 inches$^{-1}$.

The formulations of Example 1-4 were applied to 4130 steel wire rod. The treated specimens were then allowed to age for 3-5 days. Stress/strain tests were then preformed on test specimens and controls.

Figure 2:
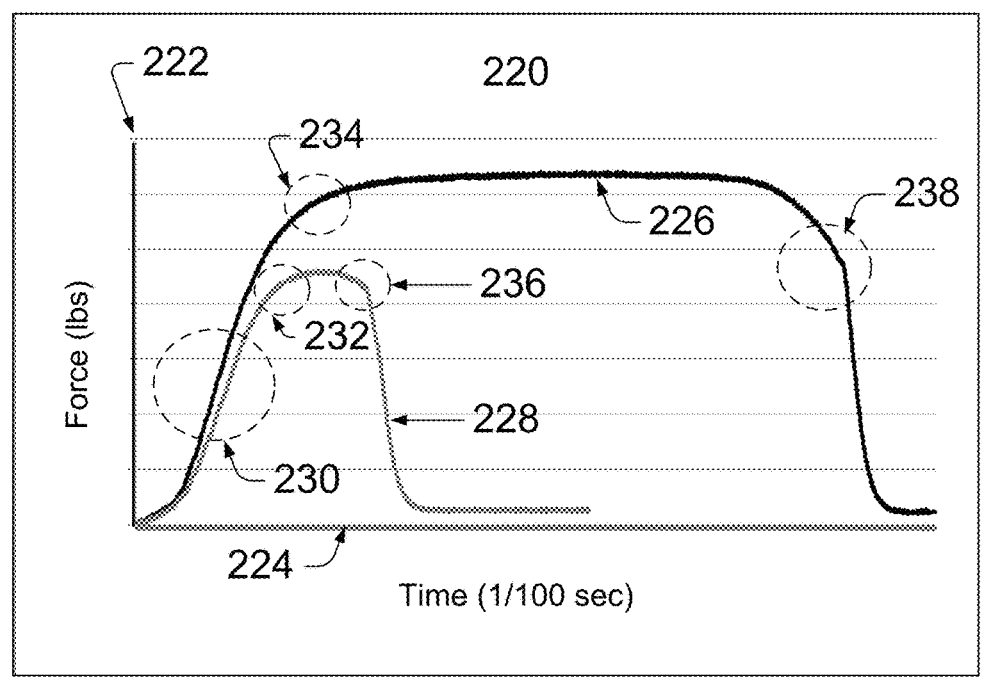
FIG. 2 is a strain plot for steel samples treated for 72 hours with one embodiment of Applicant's sprayable disarmament resin.

Referring to FIGS. 1 and 2, two representative stress-strain plots for 4340 steel rods after being treated with the Example 2 formulation are shown. FIG. 1 depicts a strain plot 200 for a steel sample treated with Example 2 formulation and aged for 24 hours (1 day). The vertical axis 202 represents the force applied to the sample. The horizontal axis 204 represents time. The stress-strain curve 206 represents the control sample, which was not treated with the Example 2 formulation. The stress-strain curve 208 represents the sample treated with the Example 2 formulation for 24 hours.

The control sample and treated sample were exposed to steadily-increasing force. The stress-strain curves 206 and 208 show steadily increasing force over time at 210. The yield point of each sample is reached at 212 where each stress-strain curve 206 and 208 begin to flatten as the samples begin to deform. The break point of each sample is reached at 214 and 216 where the samples fail under the applied force.

The treated sample, represented by curve 208, showed a reduced yield point and break point compared to the control sample, represented by curve 206.

FIG. 2 depicts a strain plot 220 for a steel sample treated with cured Table 2 formulation for 72 hours (3 days). The vertical axis 222 represents the force applied to the sample. The horizontal axis 224 represents time. The stress-strain curve 226 represents the control sample, which was not treated with the Example 2 formulation. The stress-strain curve 228 represents the sample treated with the Example 2 formulation for 72 hours.

The control sample and treated sample were exposed to steadily-increasing force. The stress-strain curves 226 and 228 show steadily increasing force over time at 230. The yield point of each sample is reached at 232 and 234 where each stress-strain curve 226 and 228 begin to flatten as the samples begin to deform. The break point of each sample is reached at 236 and 238 where the samples fail under the applied force.

The treated sample, represented by curve 228, showed a significant reduction in both yield point and break point compared to the control sample, represented by curve 226.

Referring to FIGS. 3(*a*) and 3(*b*), two representative bar graphs are shown depicting the reduction in tensile strength and elongation for steel samples treated with the Table 1 formulation and the Example 2 formulation. FIG. 3(*a*) shows a bar graph 300 depicting the tensile strength reduction for steel samples after being treated for 1 or 3 days with either the Table 1 formulation or the Example 2 formulation. The vertical axis 302 represents the percent reduction in tensile strength over control samples that have not been treated with either formulation.

Bar 304 represents a sample treated with the Table 1 formulation for 24 hours (1 day). Bar 306 represents a sample treated with the Table 1 formulation for 72 hours (3 day). Bar 308 represents a sample treated with the Example 2 formulation for 24 hours (1 day). Bar 310 represents a sample treated with the Example 2 formulation for 72 hours (3 day). Increase treatment time results in a reduction in tensile strength for both formulations. Additionally, the samples treated with the AMP-5 formulation 120, represented by 304 and 306, show increased reduction in tensile strength as compared to the sample treated with the Table 1 formulation, represented by bars 308 and 310. In general, the reduction in tensile strength indicates the damage caused by corrosion.

FIG. 3(*b*) shows a bar graph 320 depicting the elongation-to-break reduction for steel samples after being treated for 1 or 3 days with either the Table 1 formulation or the Example 2 formulation. Elongation-to-break is the distance a sample will elongate (i.e. stretch) until it fails (i.e. breaks). The vertical axis 302 represents the percent reduction in elongation-to-break over control samples that have not been treated with either formulation.

Bar 324 represents a sample treated with the Table 1 formulation for 24 hours (1 day). Bar 326 represents a sample treated with the Table 1 formulation for 72 hours (3 day).

Bar 328 represents a sample treated with the Example 2 formulation for 24 hours (1 day). Bar 330 represents a sample treated with the Example 2 formulation for 72 hours (3 day). Increase treatment time results in a reduction in elongation-to-break for both formulations. Additionally, the samples treated with the Example 2 formulation, represented by bars 324 and 326, show increased reduction in elongation-to-break as compared to the sample treated with the Table 1 formulation, represented by bars 328 and 330. In general, the reduction in elongation-to-break indicates the damage resulted from hydrogen embrittlement.

Figure 4:
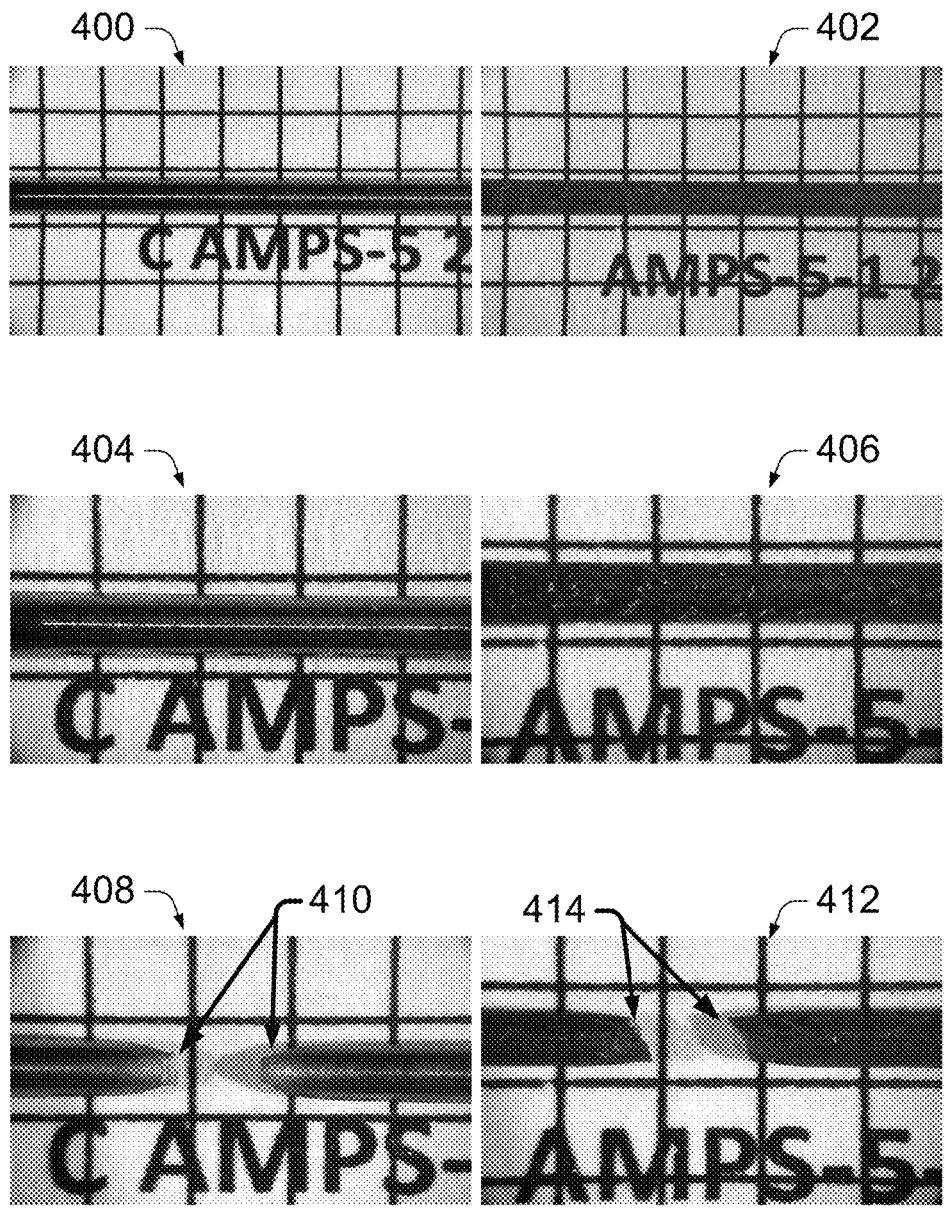
FIG. 4 contains photographs of steel samples treated with one embodiment of Applicant's sprayable disarmament resin and photographs of untreated control samples.

Referring to FIG. 4, photographs of steel samples treated with the Example 2 formulation and untreated control samples are shown. Photograph 400 shows an untreated control sample. Photograph 402 shows a sample after being treated with the Example 2 formulation for 24 hours (1 day). Photograph 404 shows a magnified view of the untreated control sample in photograph 400. Photograph 406 shows a magnified view of the sample treated with the Example 2 formulation for 24 hours in photograph 402.

Photograph 408 shows the untreated control sample after being exposed to sufficient force to reach the break point. The sample in photograph 408 shows normal elongation and necking. The normal "cup and cone" failure can be seen at the break point 410.

Photograph 412 shows the sample treated with the Example 2 formulation for 24 hours after being exposed to sufficient force to reach the break point. The sample in photograph 412 shows a non-symmetrical break at the break point 414.

Small arms in the field are often lubricated with Cosmoline to protect them from corrosion. Cosmoline is a trade name for a class of rust preventatives substances that is frequently applied to firearms to inhibit rust. Cosmoline is a homogeneous mixture of oily and waxy long-chain, non-polar hydrocarbons. A suitable disarmament resin formulations should be able to penetrate through the Cosmoline layer and readily degrade the underlying steel firearm surfaces.

Steel samples were treated with a Cosmoline layer having a thickness of 10 mils (1 inch=1000 mils). The Cosmoline layer thickness recommended by the manufacturers for corrosion protection is 1.5 mils. The Cosmoline layer applied to the samples, therefore, was well in excess of the manufacturer's recommendation thickness.

Figure 5A:
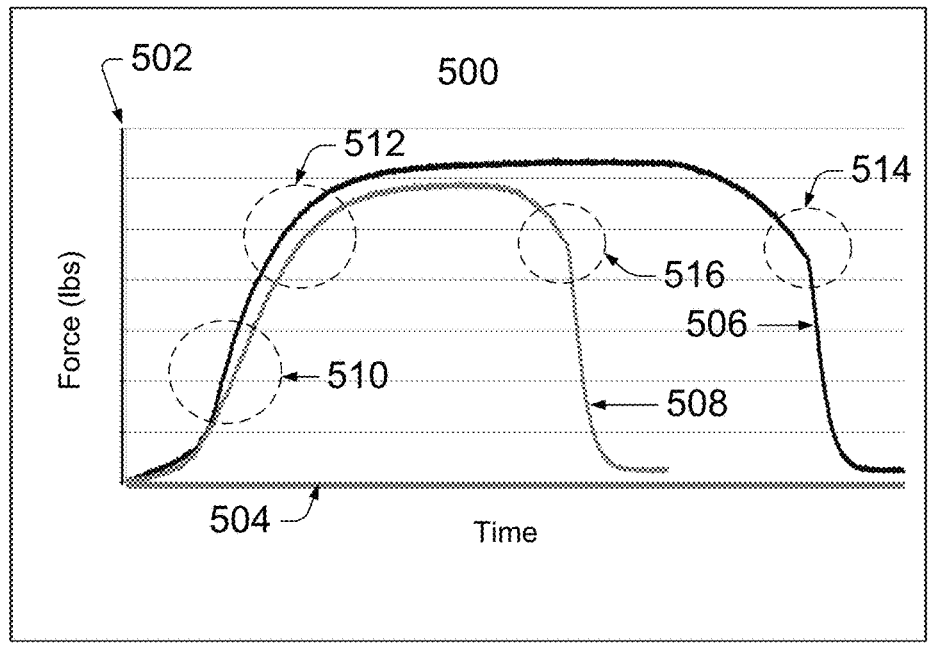
FIGS. 5(a) and 5(b) are strain plots for Cosmoline-coated steel samples treated with one embodiment of Applicant's sprayable disarmament resin for 72 hours.

Referring to FIG. 5, two representative stress-strain plots for 4340 steel rods after being treated with cured Example 2 formulation are shown. FIG. 5(*a*) depicts a strain plot 500 for a steel sample treated with cured Example 2 formulation for 72 hours (3 days). The vertical axis 502 represents the force applied to the sample. The horizontal axis 504 represents time. The stress-strain curve 506 represents the control sample, which was not treated with the Example 2 formulation. The stress-strain curve 508 represents the sample treated with the Example 2 formulation for 72 hours.

The control sample and treated sample were exposed to steadily-increasing force. The stress-strain curves 506 and 508 show steadily increasing force over time at 510. The yield point of each sample is reached at 512 where each stress-strain curve 506 and 508 begin to flatten as the samples begin to deform. The break point of each sample is reached at 514 and 516 where the samples fail under the applied force.

Despite the presence of the 10-mil thick Cosmoline layer, the treated sample, represented by curve 508, showed a reduced yield point and a significant reduction in break point compared to the control sample, represented by curve 506.

Figure 5B:
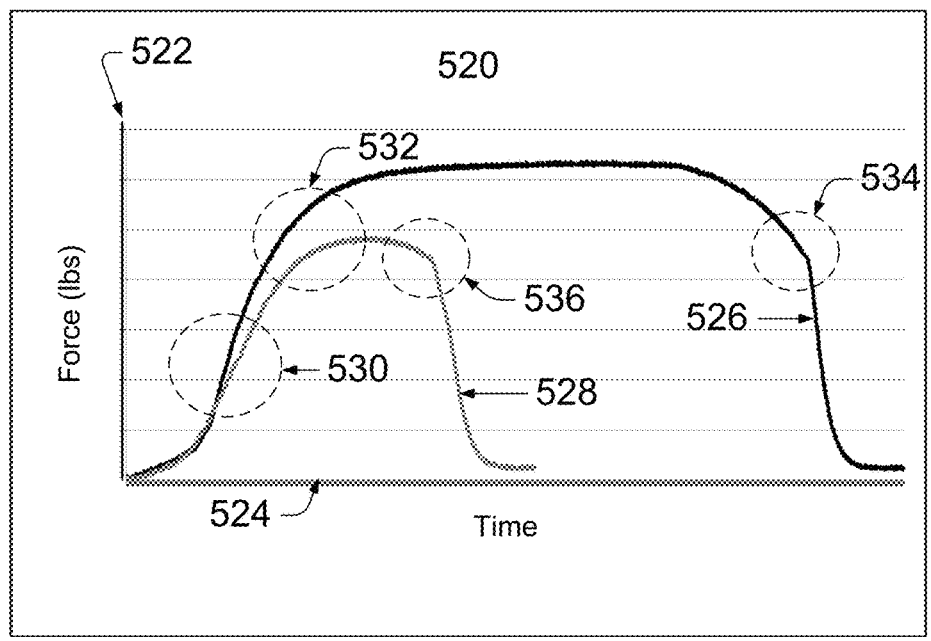

FIG. 5(b) depicts a strain plot 520 for a steel sample treated with cured Example 2 formulation for 144 hours (6 days). The vertical axis 522 represents the force applied to the sample. The horizontal axis 524 represents time. The stress-strain curve 526 represents the control sample, which was not treated with the Example 2 formulation. The stress-strain curve 528 represents the sample treated with the Example 2 formulation for 144 hours.

The control sample and treated sample were exposed to steadily-increasing force. The stress-strain curves 526 and 528 show steadily increasing force over time at 530. The yield point of each sample is reached at 532 where each stress-strain curve 526 and 528 begin to flatten as the samples begin to deform. The break point of each sample is reached at 534 and 536 where the samples fail under the applied force.

Despite the presence of the 10-mil thick Cosmoline layer, the treated sample, represented by curve 528, showed a considerable reduction in both yield point and break point compared to the control sample, represented by curve 226.

Figure 6A:
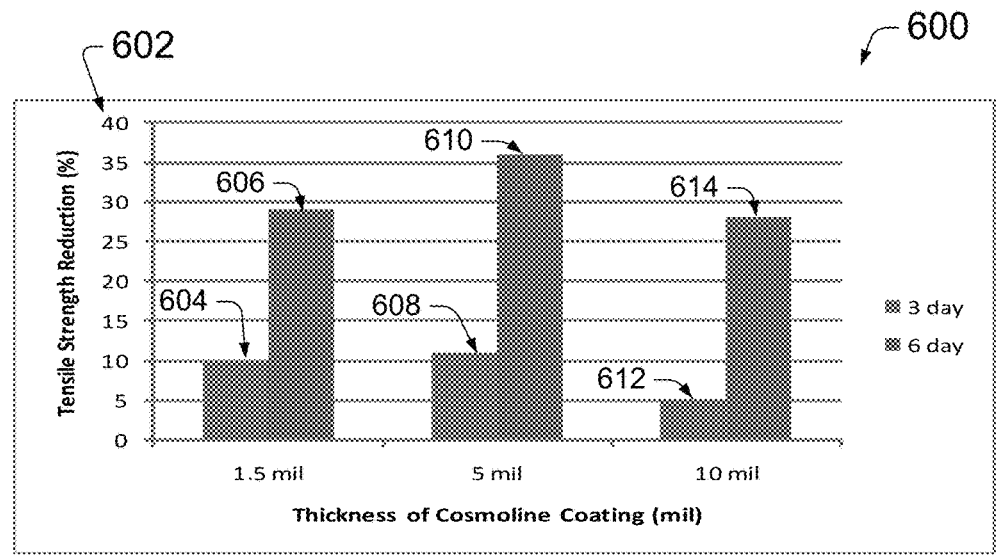
FIGS. 6(a) and 6(b) are bar graphs showing the reduction in tensile strength and elongation-to-break for Cosmoline-coated steel samples after being treated for 24 or 72 hours with two embodiments of Applicant's sprayable disarmament resin.

Referring to FIG. 6, two representative bar graphs are shown depicting the reduction in tensile strength and elongation for steel samples coated with a Cosmoline layer of varying thicknesses (1.5 mil, 5 mil, and 10 mil) and treated with the Example 2 formulation. FIG. 6(a) shows a bar graph 600 depicting the tensile strength reduction for steel samples having a Cosmoline layer of 1.5 mils, 5 mils, or 10 mils and after being treated for 72 hours or 144 hours (3 or 6 days) with the Example 2 formulation. The vertical axis 602 represents the percent reduction in tensile strength over control samples that have not been treated with either formulation.

1.5 mil Cosmoline Coating. Bar 604 represents a sample coated with a 1.5 mil layer of Cosmoline layer and treated with the Example 2 formulation for 72 hours (3 days). Bar 606 represents a sample coated with a 1.5 mil layer of Cosmoline layer and treated with the Example 2 formulation for 144 hours (6 days).

5 mil Cosmoline Coating. Bar 608 represents a sample coated with a 5 mil layer of Cosmoline layer and treated with the Example 2 formulation for 72 hours (3 days). Bar 610 represents a sample coated with a 5 mil layer of Cosmoline layer and treated with the Example 2 formulation for 144 hours (6 days).

10 mil Cosmoline Coating. Bar 612 represents a sample coated with a 10 mil layer of Cosmoline layer and treated with the Example 2 formulation for 72 hours (3 days). Bar 614 represents a sample coated with a 10 mil layer of Cosmoline layer and treated with the Example 2 formulation for 144 hours (6 days).

Figure 6B:
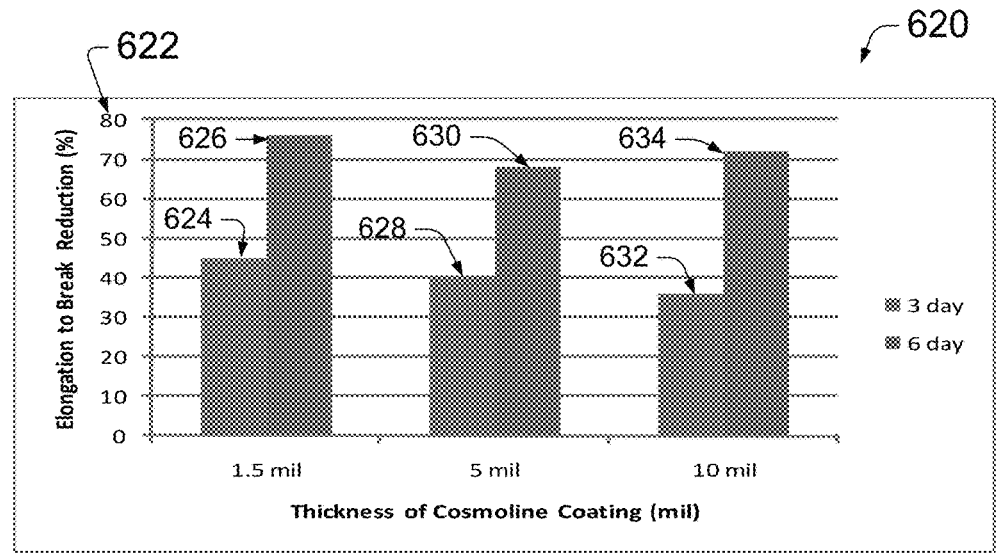

FIG. 6(b) shows a bar graph 620 depicting the elongation-to-break reduction for steel samples having a Cosmoline layer of 1.5 mils, 5 mils, or 10 mils and after being treated for 72 hours or 144 hours (3 or 6 days) with the Example 2 formulation. The vertical axis 622 represents the percent reduction in elongation-to-break over control samples that have not been treated with either formulation.

1.5 mil Cosmoline Coating. Bar 624 represents a sample coated with a 1.5 mil layer of Cosmoline layer and treated with the Example 2 formulation for 72 hours (3 days). Bar 626 represents a sample coated with a 1.5 mil layer of Cosmoline layer and treated with the Example 2 formulation for 144 hours (6 days).

5 mil Cosmoline Coating. Bar 628 represents a sample coated with a 5 mil layer of Cosmoline layer and treated with the Example 2 formulation for 72 hours (3 days). Bar 630 represents a sample coated with a 5 mil layer of Cosmoline layer and treated with the Example 2 formulation for 144 hours (6 days).

10 mil Cosmoline Coating. Bar 632 represents a sample coated with a 10 mil layer of Cosmoline layer and treated with the Example 2 formulation for 72 hours (3 days). Bar 634 represents a sample coated with a 10 mil layer of Cosmoline layer and treated with the Example 2 formulation for 144 hours (6 days).

Figure 3A:
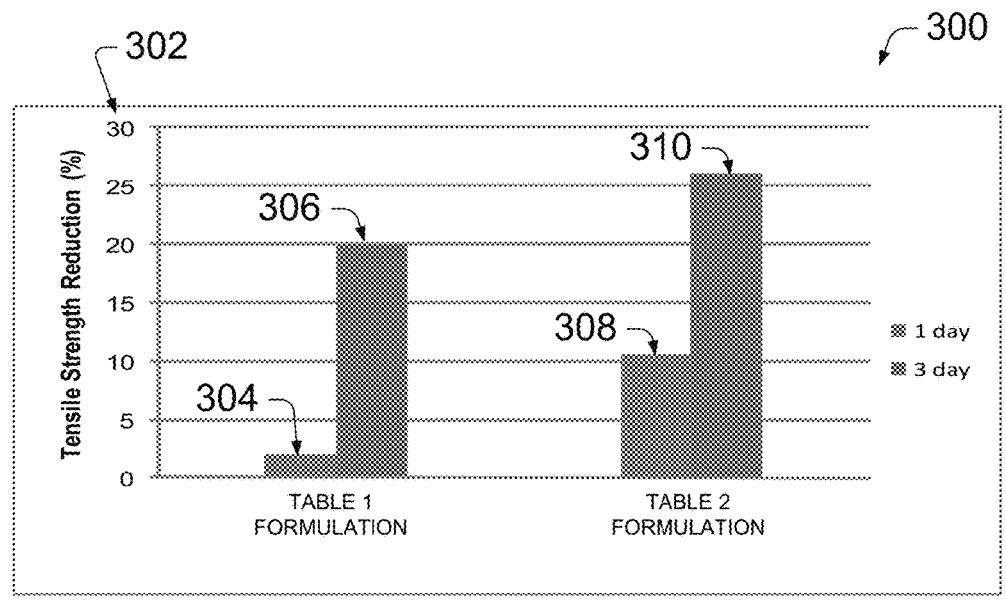
FIGS. 3(a) and 3(b) are bar graphs showing the tensile strength reduction for steel samples after being treated for 24 or 72 hours with two embodiments of Applicant's sprayable disarmament resin.
Figure 3B:
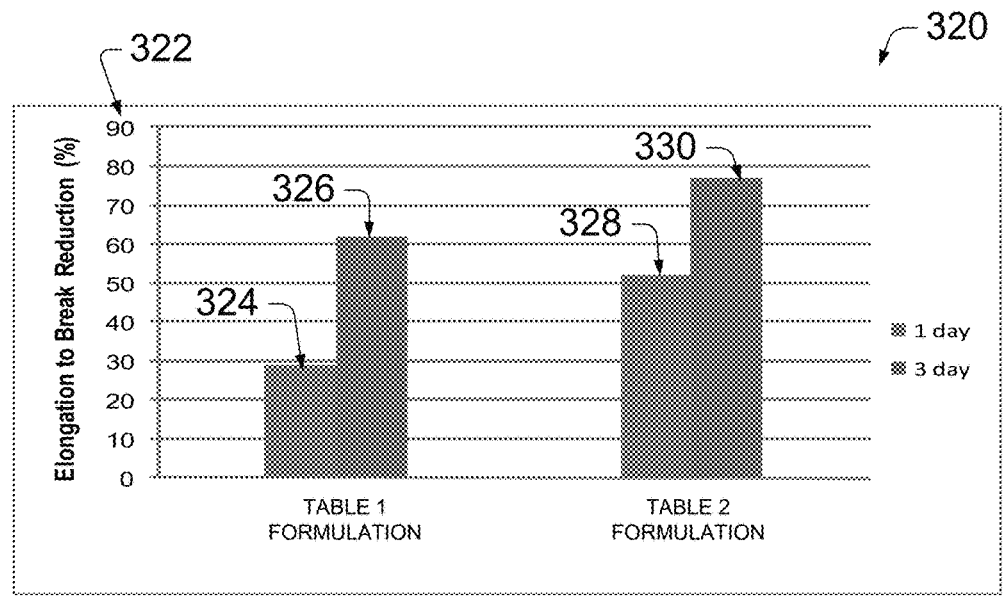

Compared to the samples that were not coated with Cosmoline, FIGS. 3(a) and 3(b), the rate by which the steel corroded and became hydrogen embrittled, as shown in FIGS. 6(a) and 6(b), decreased as the Cosmoline thickness increased. All Cosmoline samples treated with the Example 2 formulation, however, were ultimately degraded as a result of the treatment.

Figure 7:
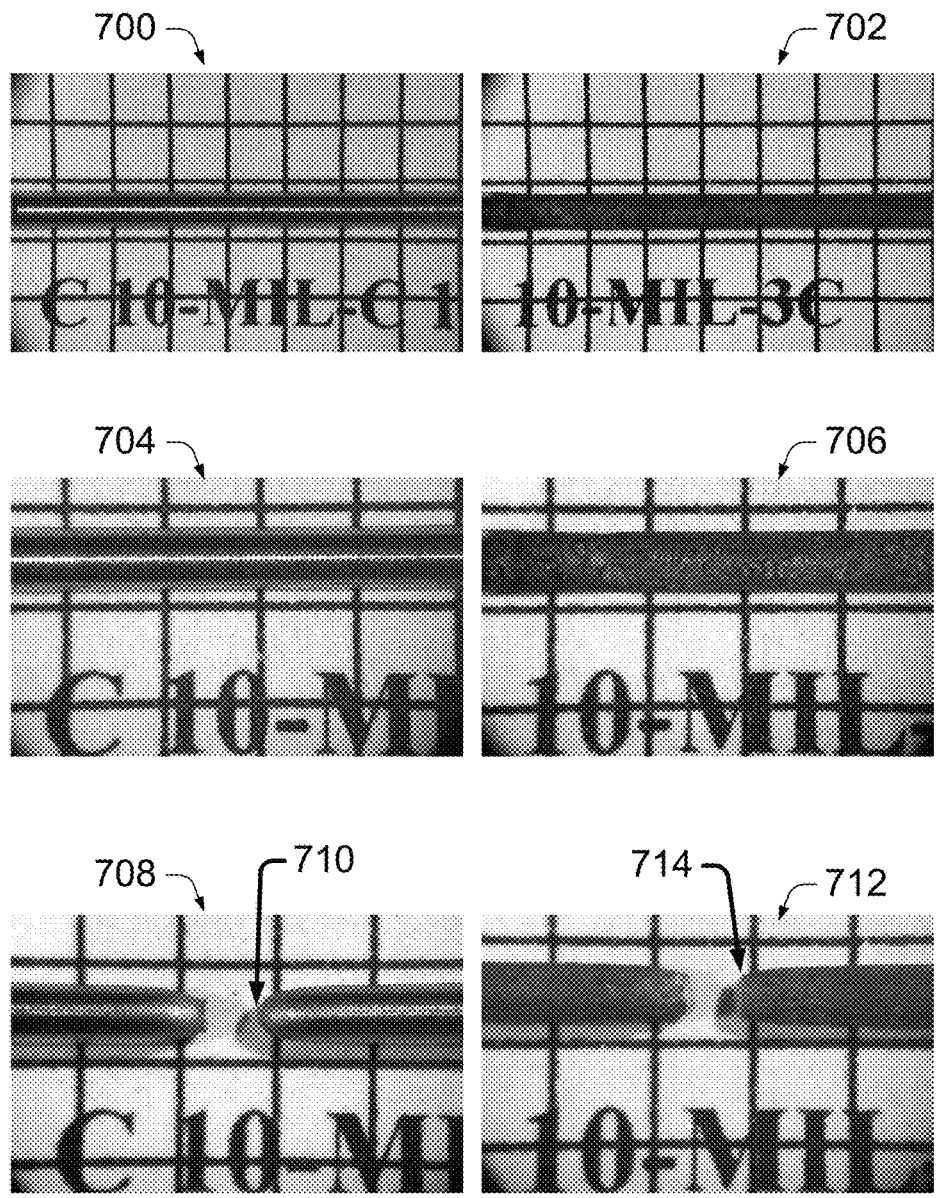
FIG. 7 contains photographs of Cosmoline-coated steel samples treated with one embodiment of Applicant's sprayable disarmament resin for 72 hours and photographs of untreated control samples.

Referring to FIG. 7, photographs of steel samples with a 10 mil Cosmoline coating are shown. Photographs 700, 704, and 708 are photographs of untreated control samples. Photographs 702, 706, and 712 are photographs of samples treated with the Example 2 formulation for 72 hours (3 days).

Photograph 700 shows an untreated control sample. Photograph 702 shows a sample coated with a 10 mil Cosmoline layer after being treated with the Example 2 formulation for 72 hours (3 days). Photograph 704 shows a magnified view of the untreated control sample in photograph 700. Photograph 706 shows a magnified view of the sample coated with a 10 mil Cosmoline layer after being treated with the Example 2 formulation for 72 hours in photograph 702.

Photograph 708 shows the untreated control sample after being exposed to sufficient force to reach the break point. The sample in photograph 708 shows normal elongation and necking. The normal "cup and cone" formation can be seen at the break point 710.

Photograph 712 shows the sample coated with a 10 mil Cosmoline layer after being treated with the Example 2 formulation for 72 hours and after being exposed to sufficient force to reach the break point. The sample in photograph 712 shows a non-symmetrical break at the break point 714.

Figure 8:
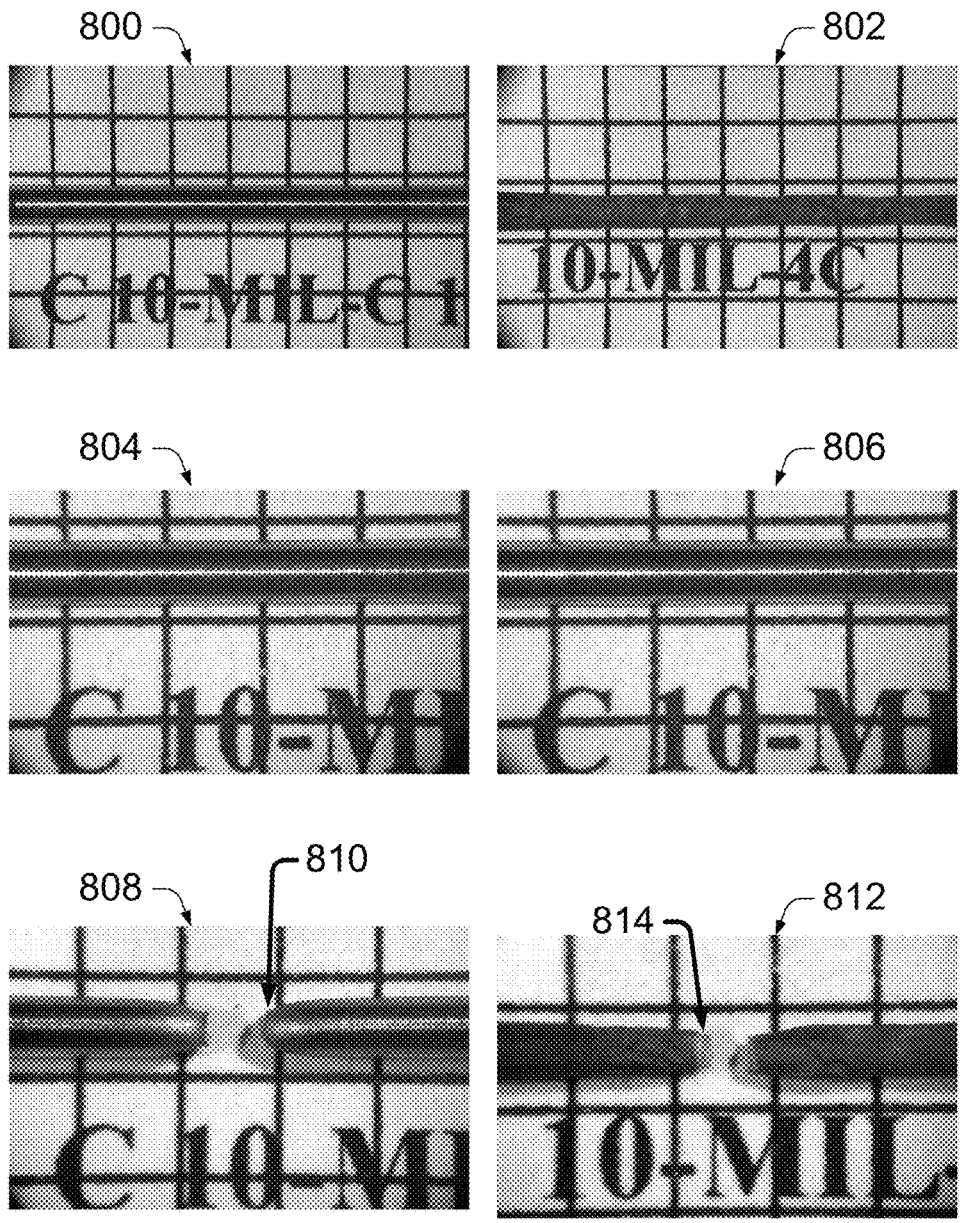
FIG. 8 contains photographs of Cosmoline-coated steel samples treated with one embodiment of Applicant's sprayable disarmament resin for 144 hours and photographs of untreated control samples.

Referring to FIG. 8, photographs of steel samples with a 10 mil Cosmoline coating are shown. Photographs 800, 804, and 808 are photographs of untreated control samples. Photographs 802, 806, and 812 are photographs of samples treated with the Example 2 formulation for 144 hours (6 days).

Photograph 800 shows an untreated control sample. Photograph 802 shows a sample after being treated with the Example 2 formulation for 144 hours (6 days). Photograph 804 shows a magnified view of the untreated control sample in photograph 800. Photograph 806 shows a magnified view of the sample treated with the Example 2 formulation for 144 hours in photograph 802.

Photograph 808 shows the untreated control sample after being exposed to sufficient force to reach the break point. The sample in photograph 808 shows normal elongation and necking. The normal "cup and cone" failure can be seen at the break point 810.

Photograph 812 shows the sample coated with a 10 mil Cosmoline layer after being treated with the Example 2 formulation for 144 hours and after being exposed to sufficient force to reach the break point. The sample in photograph 812 shows a non-symmetrical break at the break point 814.

Significant pitting can be observed in the resin treated specimen as shown in photographs 702, 706, 712 (72 hour treatment) and 802, 806, 812 (144 hour exposure). In comparison, there was no pitting observed in the Cosmoline treated control specimens, as shown in the photographs 700, 704, 708 and 800, 804, 808. This shows that the cured Example 2 formulation was able to permeate through the Cosmoline and induce localized pitting corrosion within the steel specimens.

Figure 9:
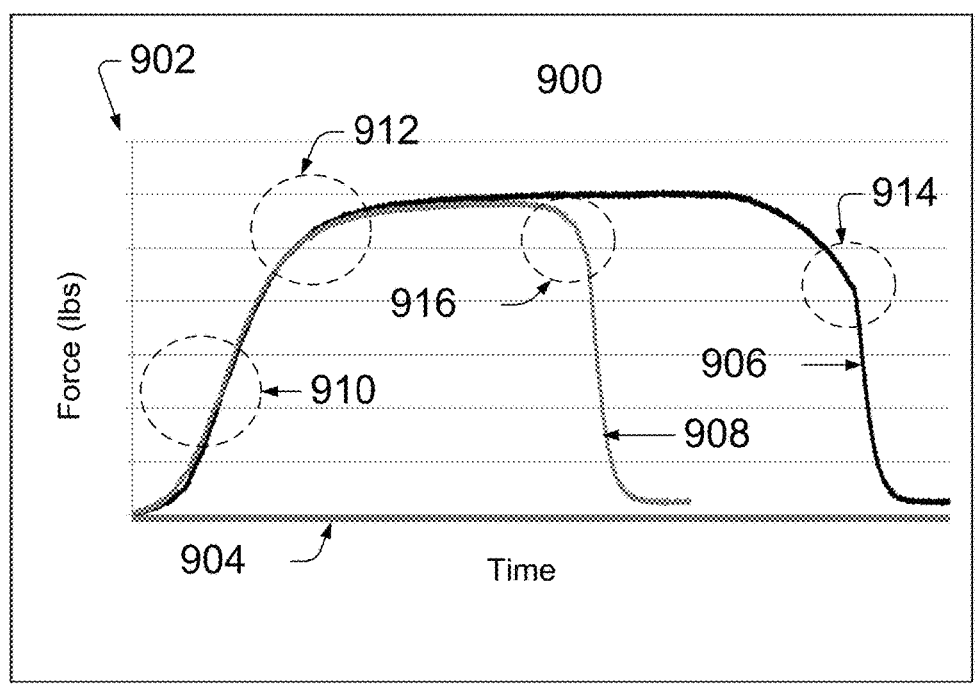
FIG. 9 is a strain plot for steel samples treated with one embodiment of Applicant's dispensable disarmament resin for 72 hours.

FIG. 9 depicts a strain plot 900 for a steel sample treated with Table 3 formulation for 72 hours (3 days). The vertical axis 902 represents the force applied to the sample. The horizontal axis 904 represents time. The stress-strain curve 906 represents the control sample, which was not treated with the Table 3 formulation. The stress-strain curve 908 represents the sample treated with the Table 3 formulation for 72 hours.

The control sample and treated sample were exposed to steadily-increasing force. The stress-strain curves 906 and 908 show steadily increasing force over time at 910. The yield point of each sample is reached at 912 where each stress-strain curve 906 and 908 begin to flatten as the samples begin to deform. The break point of each sample is reached at 914 and 916 where the samples fail under the applied force.

The treated sample, represented by curve 908, showed a reduced break point compared to the control sample, represented by curve 906. The average tensile strength reduction is 6.6% for resin treated steel versus control, while its reduction in elongation-to-break is 54%.

Figure 10:
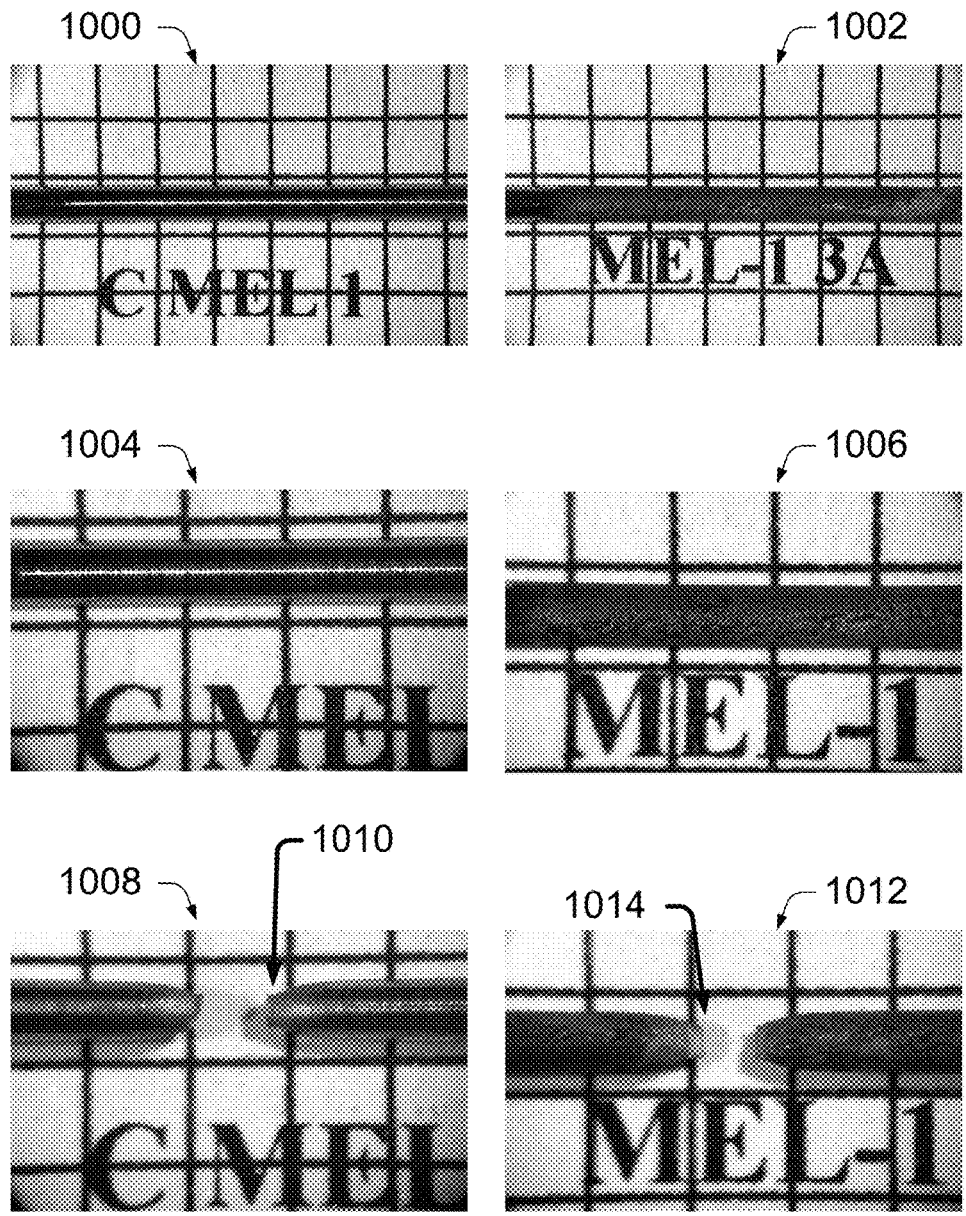
FIG. 10 contains photographs of steel samples treated with one embodiment of Applicant's dispensable disarmament resin for 72 hours and photographs of untreated control samples.

Referring to FIG. 10, photographs of steel samples treated with the Table 3 formulation and an untreated control samples are shown. Photograph 1000 shows an untreated control sample. Photograph 1002 shows a sample after being treated with the Table 3 formulation for 72 hours (3 days). Photograph 1004 shows a magnified view of the untreated control sample in photograph 1000. Photograph 1006 shows a magnified view of the sample treated with the Table 3 formulation for 72 hours in photograph 1002.

Photograph 1008 shows the untreated control sample after being exposed to sufficient force to reach the break point. The sample in photograph 1008 shows normal elongation and necking. The normal "cup and cone" failure can be seen at the break point 1010.

Photograph 1012 shows the sample treated with the Table 3 formulation for 72 hours after being exposed to sufficient force to reach the break point. The sample in photograph 1012 shows a non-symmetrical break at the break point 1014.

Equivalent structural tests were also performed on SAE 1020 grade threaded steel rods, SAE 1025 grade threaded steel rods, SAE 1045 grade tempered steel rods, SAE 4140 grade tempered steel rods, AK-47 Rifle Barrel Sections, and AK-47 springs, all with similar results. Applicant's composition also proved to be effective in degrading metal coated with a chrome layer, as is the case with the interior surface of AK-47 and other firearm barrels.

Corrosive Foam Embodiments

Applicant's composition is also useful to corrode and otherwise render inoperable electronics systems, including circuit boards, and other systems containing exposed wires or other microelectronics. The cured resin of Applicant's composition is highly conductive, with a measured conductivity value of 7500 $\mu S \cdot cm^{-1}$, which is approximately twice as conductive as a 2000 ppm solution of NaCl in water (3860 $\mu S \cdot cm^{-1}$). In addition, the resin has been shown to be effective in degrading the copper and other conductive components of the electronic device.

Figure 11:
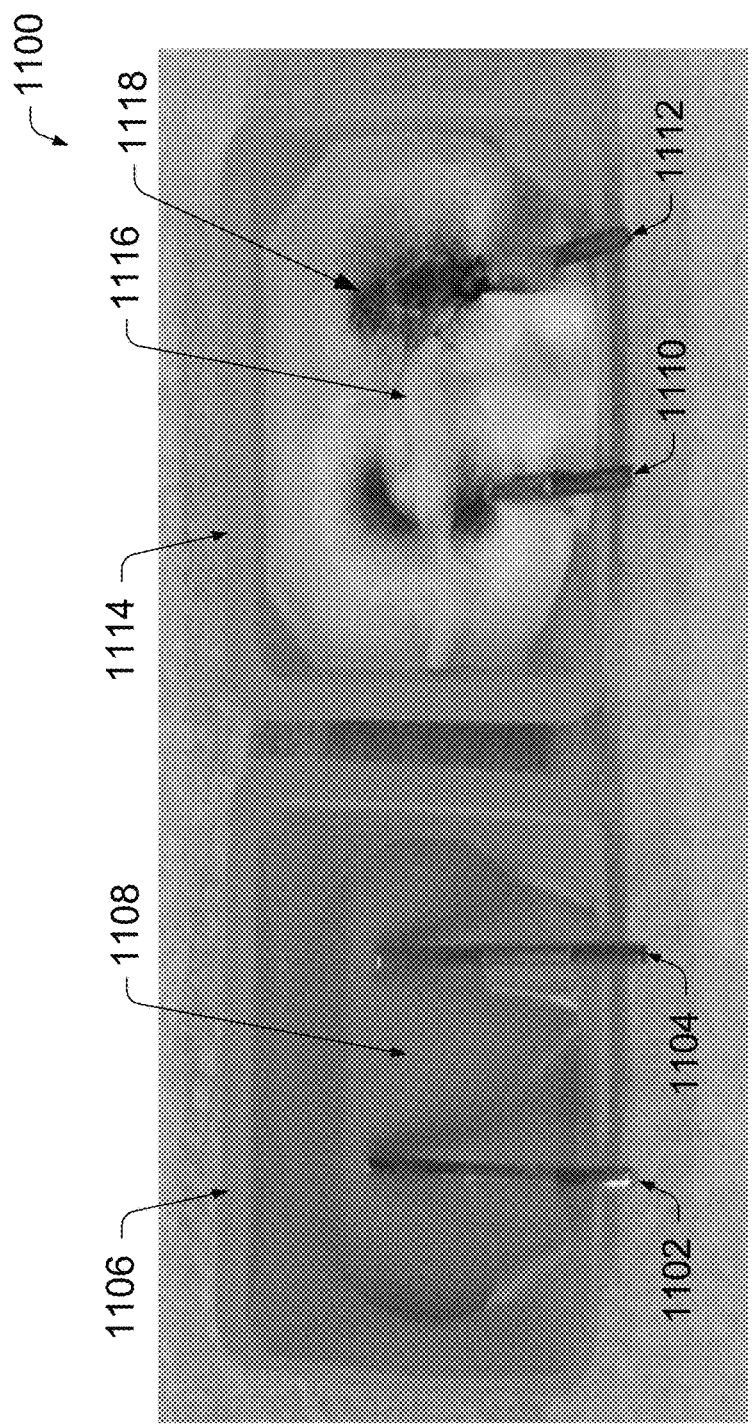
FIG. 11 contains a photograph of copper wires treated with one embodiment of Applicant's dispensable sprayable resin and a photograph of untreated copper wires.

Referring to FIG. 11, a photograph 1100 of copper wires treated with the Example 2 formulation and an untreated control sample is shown. Two copper wires 1102 and 1104 are shown in a container 1106. No other material is added to the container 1108. The resistance between copper wire 1102 and copper wire 1104, measured with a digital multimeter, shows no electrical connection (i.e. infinite resistance between the wires).

Two copper wires 1110 and 1112 are shown in a second container 1114. The Example 2 formulation was added to the container 1114 as shown at 1116. The resistance between the copper wire 1102 and copper wire 1104, measured with a digital multimeter, showed a resistance of ~200Ω. This resistance value equates to a conductivity value of 7500 $\mu S \cdot cm^{-1}$, approximately twice as conductive as a 2000 ppm solution of NaCl in water (3860 $\mu S \cdot cm^{-1}$). Additionally, the corrosion of the copper wire is indicated by the darkened areas surrounding the portion of each wire 1110 and 1112 covered by the Example 2 formulation. The corrosion area for wire 1112 is indicated at 1118.

As such, two degradation modes exist for the Applicant's composition when applied to electrical circuitry. Applicant's composition corrodes any exposed metal and composite materials. Applicant's composition also forms low resistance electrical connections between all exposed electrically active portions of the circuit, rendering the circuit instantly inoperative. In addition, the cured resin, resulting from application of Applicant's composition, encases the circuit in a tough, intractable thermoset polymer that cannot be easily removed. As the resin cures, the resistance between copper wires 1110 and 1112 will increase over time due to loss of water and the build up of corrosive material. By that point, however, significant corrosion of the electrically active circuit components is expected to further render the circuit inoperative.

Tables 5 through 8 recite foamable embodiments of Applicant's composition. In certain embodiments, Applicant's foamable composition comprises Cocamidopropyl betaine (CAB) XI

XI

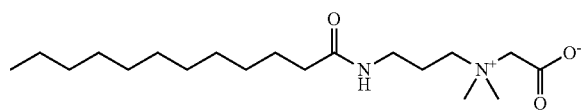

TABLE 5

| Part | Component | Function | Concentration (wt %) |
|---|---|---|---|
| A | NaCl | Corrosion/Pitting Promoter | 8.4 |
|   | Methyldiethanol amine | Corrosion/pitting Promoter, Stress Corrosion Cracking Promoter | 8.14 |
|   | Cocamidopropyl betaine | Foaming Agent | 6.56 |
| B | $Na_2S_2O_8$ (Sodium Persulfate) | Corrosion/Pitting Promoter | 15.59 |
| — | $H_2O$ (water) | Solvent | 61.31 |
|   | TOTAL |   | 100.00 |

TABLE 6

| Part | Component | Function | Concentration (wt %) |
|---|---|---|---|
| A | $CaCl_2$ | Corrosion/Pitting Promoter | 8.79 |
|   | Methyldiethanol amine | Corrosion/pitting Promoter, Stress Corrosion Cracking Promoter | 7.92 |
|   | Surfactant | Foaming Agent | 9.07 |
| B | $Na_2S_2O_8$ (Sodium Persulfate) | Corrosion/Pitting Promoter | 15.17 |
| — | $H_2O$ (water) | Solvent | 59.05 |
|   | TOTAL |   | 100.00 |

Stable, thick foams (maintaining height >1 day) were produced from the compositions of Table 6, wherein the Surfactant is selected from the group consisting of SCHERCOTAIN SCAB-50 Betaine Amphoteric (INCI Name: Cocamidopropyl Hydroxysultaine, Lubrizol Corporation, Wickliffe, Ohio), CHEMBETAIN CAS (INCI Name: Cocamidopropyl Hydroxysultaine, Lubrizol Corporation, Wickliffe, Ohio), and CHEMBETAINE LHS (INCI Name: Lauryl Hydroxy Sultaine, Lubrizol Corporation, Wickliffe, Ohio).

TABLE 7

| Part | Component | Function | Concentration (wt %) |
|---|---|---|---|
| A | $CaCl_2$ | Corrosion/Pitting Promoter | 6.96 |
|   | $Na_2S_2O_3$ (Sodium Thiosulfate) | Corrosion/pitting Promoter, Stress Corrosion Cracking Promoter | 8.35 |
|   | Surfactant | Foaming Agent | 8.91 |
| B | $Na_2S_2O_8$ (Sodium Persulfate) | Corrosion/Pitting Promoter | 12.02 |
| — | $H_2O$ (water) | Solvent | 63.76 |
|   | TOTAL |   | 100.00 |

The formulation of Table 7 gives a stable foam comprising a lower density than the foams of Table 6. The foams of Table 7 utilized a Surfactant selected from the group consisting of SCHERCOTAIN SCAB-50 Betaine Amphoteric (INCI Name: Cocamidopropyl Hydroxysultaine, Lubrizol Corporation, Wickliffe, Ohio), CHEMBETAIN CAS (INCI Name: Cocamidopropyl Hydroxysultaine, Lubrizol Corporation, Wickliffe, Ohio), and CHEMBETAINE LHS (INCI Name: Lauryl Hydroxy Sultaine, Lubrizol Corporation, Wickliffe, Ohio).

TABLE 8

| Part | Component | Function | Concentration (wt %) |
|---|---|---|---|
| A | NaCl | Corrosion/Pitting Promoter | 8.17 |
|   | Methyldiethanol amine | Corrosion/pitting Promoter, Stress Corrosion, Cracking Promoter | 7.92 |
|   | Surfactant | Foaming Agent | 9.07 |
| B | $Na_2S_2O_8$ (Sodium Persulfate) | Corrosion/Pitting Promoter | 15.17 |
| — | $H_2O$ (water) | Solvent | 59.67 |
|   | TOTAL |   | 100.00 |

The formulation of Table 8 gives a thick foam, wherein the Surfactant comprises CHEMOXIDE CAW (INCI Name: Cocamidopropylamine Oxide, Lubrizol Corporation Wickliffe, Ohio).

In certain embodiments, Applicant's composition comprises Monomer III and N, N'-methylene bis-acrylamide, compound VII, in the amounts of Table 1 or Example 2, in combination with the formulations of Tables 5, 6, 7, or 8. The resulting foam shows enhanced stabilization with respect to drainage and settling.

The Table 5, 6, 7, and 8, formulations produce a foam when agitated or aerated, such as with a aeration nozzle. In one embodiment, when applied to a circuit or other electrical equipment, the foam corrodes exposed metal circuitry and electrically connects all circuits that it contacts, thereby shorting the circuit. Application of a Table 5, 6, 7, and/or 8, formulation thereby renders the circuit inoperable by initially electrically shorting the circuit and, over time, corroding the metal portions of the circuit.

In certain embodiments, a Table 5, 6, 7, and/or 8, formulation can be prepared by combining the first four listed components in powdered form. When deployed, the final component, water, is added to the mixture, aerated to create a foam, and applied to the target. A suitable applicator, such as described in FIG. 12, may be used to hydrate, aerate, and dispense the Table 5 formulation on the target.

The methyldiethanol amine component recited in Tables 5, 6, 7, and 8, can be replaced using a substitute amine selected from the group consisting of hexamethylenetetramine, ethanolamine, diethanolamine, triethanolamine, monoisopropanolamine, diisopropanolamine, triisopropanolamine, polyethyleneimine, Bis-(hydroxyethyl) methylamine, and 2-amino-2-methyl-l-propanol. The substituted amine replaces methyldiethanol amine in equivalent molar quantities.

Applicant's composition can be transported in the form of two dry and relatively safe precursor components in powder form. In one embodiment, an applicator device for either the sprayable embodiment or the dispensable gel embodiment may contain three chambers: a first chamber for holding the first hydrated precursor, a second chamber for holding the second hydrated precursor, and a third chamber for allowing the first and second precursors to combine and mix, thereby commencing the polymerization reaction. The powdered precursor may be hydrated before being added to the applicator device, or alternately, may be hydrated directly in their respective chambers in the device. A pumping means is added to the application device to drive the hydrated subcomponents into the mixing chamber. The pumping means also drives the combined hydrated precursor mixture out through a spray head (for the sprayable embodiment) or a nozzle (for the dispensable gel embodiment) and onto the target. In another embodiment, the hydrated precursors are mixed manually in a container and applied to the target with a brush or poured over the target.

Figure 12:
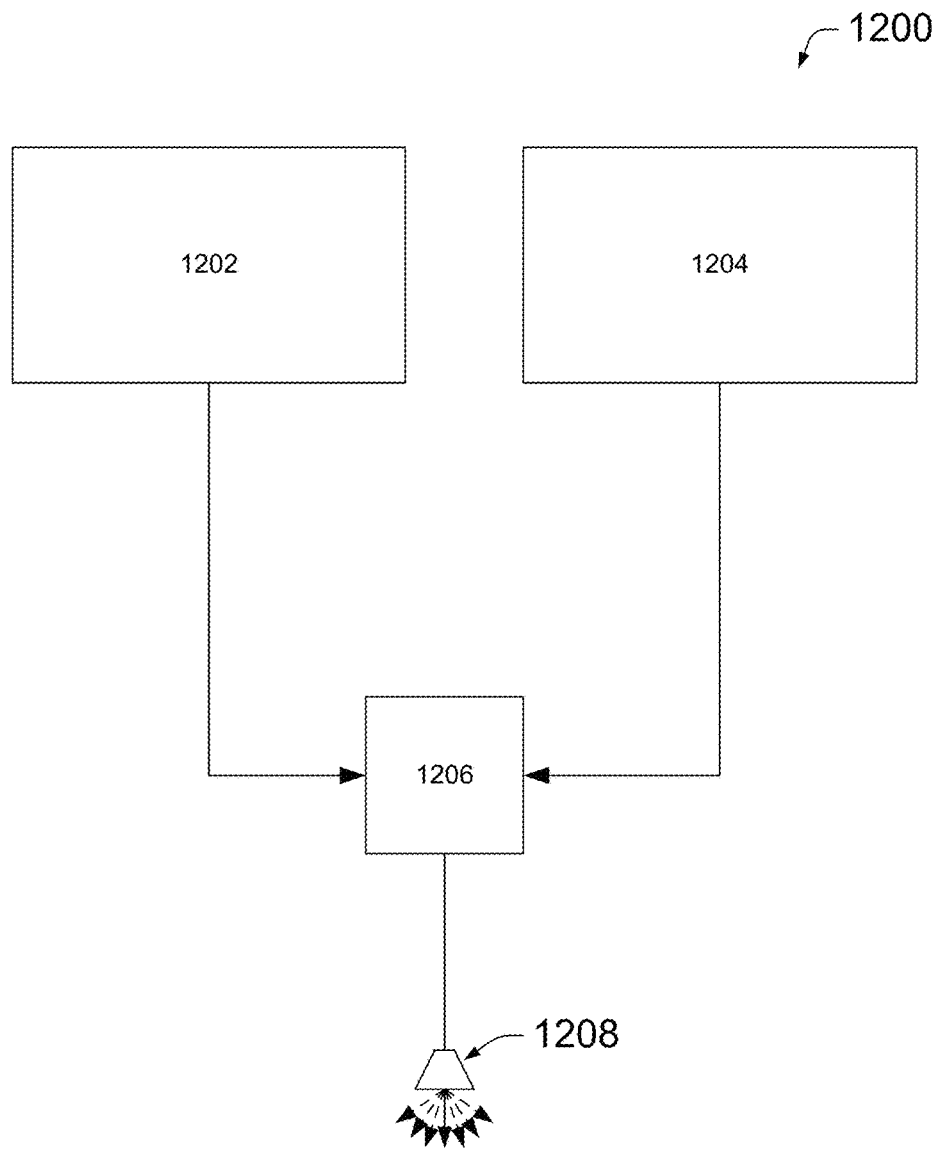
FIG. 12 is a drawing depicting one embodiment of a system to dispense Applicant's disarmament resin.

Referring to FIG. 12, a Part A component of a sprayable formulation, such as and without limitation the Example 1-3 formulations, or an Part A component of a dispensable gel formulation, such as and without limitation the Example 3 formulation, is added to chamber 1202. The Part A component comprises a resin monomer, a resin crosslinking agent, a corrosion promoter, and a free radial initiator. In one embodiment, the Part A component is added in powder form and a sufficient amount of water is subsequently added to chamber 1202. In another embodiment, the Part A component is hydrated before being added to chamber 1202.

In these embodiments, a Part B component for either the sprayable or dispensable gel formulations is added to chamber 1204. The Part B component comprises a polymerization initiator. In one embodiment, the Part B component is added in powder form and a sufficient amount of water is subsequently added to chamber 1204. In another embodiment, the Part B component is hydrated before being added to chamber 1204.

The contents of chamber 1202 and chamber 1204 are directed into chamber 1206. This can occur by a pumping means or physical mixing. Chamber 1206 allows polymerization of the mixture to commence. The mixed contents of chamber 1206 are subsequently directed outwardly through a nozzle, a spray head, or an aerator, depending on whether Applicant's composition is dispensable, sprayable, or foamable, respectively, and onto the target.

Figure 13:
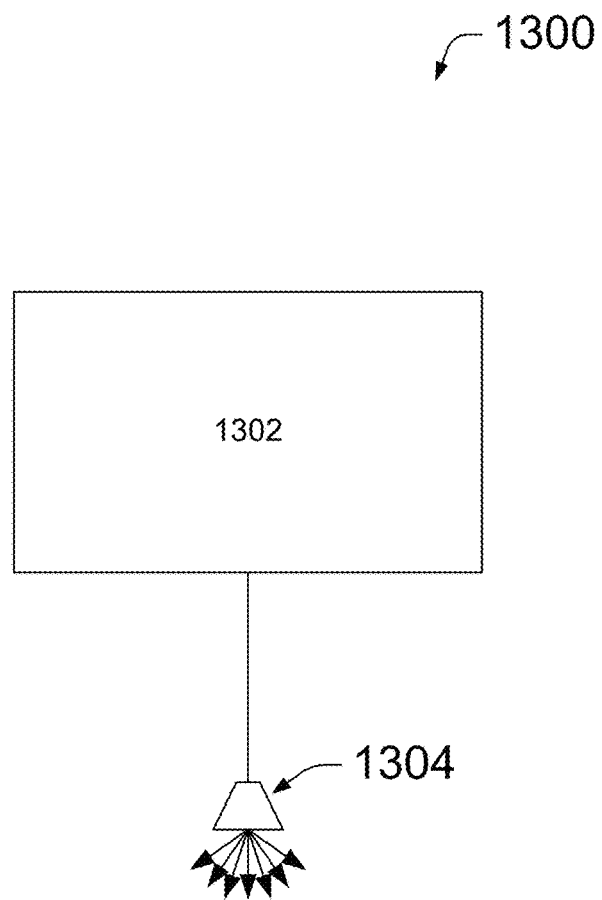
FIG. 13 is a drawing depicting one embodiment of a system to dispense Applicant's foamable disarmament resin.

Referring to FIG. 13, a block diagram 1300 represents an applicator to dispense the Table 4 formulation. The first four listed components of the Table 5 formulation (NaCl, Methyldiethanol amine, MAFO CAB CG Betaine, Sodium Persulfate) are combined and added to chamber 1302 to form a Part A mixture. In one embodiment, water is added to hydrate the mixture. In another embodiment, the mixture is hydrated before being added to chamber 1302. In one embodiment, a force is applied to the hydrated mixture in chamber 1302, though a pumping means or though direct pressure, to force the mixture though an aeration nozzle 1304.

Figure 14:
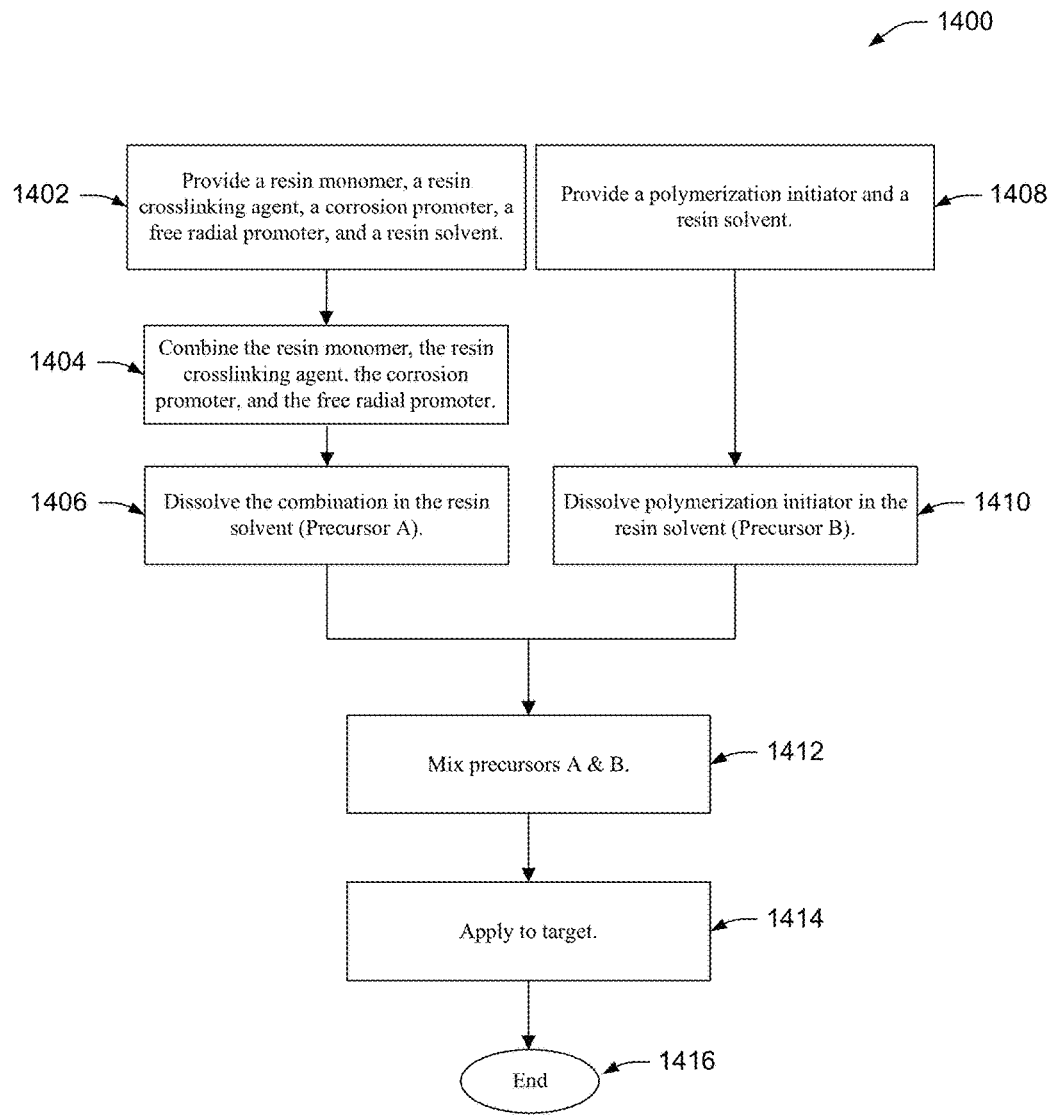
FIG. 14 is a flowchart depicting an exemplary method to create and use Applicant's disarmament resin.

Referring to FIG. 14, a flowchart 1400 shows an exemplary embodiment of a method to create and use the disarmament resin. A resin monomer, a resin crosslinking agent, a corrosion promoter, a free radial promoter, and a resin solvent are provided at step 1402. In one embodiment, the resin monomer is AMPS 2405, the resin crosslinking agent is N-N' methylenebisacrylamide, the corrosion promoter is calcium chloride, the free radial promoter is sodium thiosulfate, and the resin solvent is water. In another embodiment, the resin monomer is melamine-glyoxal-acrylamide, the corrosion promoter is calcium chloride, the free radial promoter is sodium thiosulfate, and the resin solvent is water.

The resin monomer, resin crosslinking agent, corrosion promoter, and free radial promoter are combined at 1404 to create a powdered mixture. The resin solvent is added to the mixture at step 1406. The mixture is dissolved in the resin solvent to form Precursor A.

A polymerization initiator and a resin solvent are provided at step 1408. In one embodiment, the polymerization initiator is sodium persulfate and the resin solvent is water. The resin solvent is added to the polymerization initiator at step 1410. The mixture is dissolved in the resin solvent to form Precursor B.

The Precursor A and the Precursor B are mixed at step 1412. Polymerization begins immediately upon mixing as the polymerization initiator as the free radical promoter and polymerization initiator initiate a free radical polymerization of the resin monomer. In one embodiment, mixing step 1412 may occur in an applicator device where Precursor A and Precursor B are forced into a common chamber. In another embodiment, mixing step 1412 may occur in a container by manual stirring. The mixture of Precursor A and Precursor B is applied to the target at step 1414. In one embodiment, the mixture is a sprayable liquid that is forced through a spray head and onto a target. In another embodiment, the target is a metal or composite material intended to be degraded. In yet another embodiment, the mixture is a dispensable gel that is forced through an applicator head and onto a target. In yet another embodiment, the mixture is a foamable liquid that is forced through an applicator head and onto a target. The method ends at step 1416.

Figure 17:
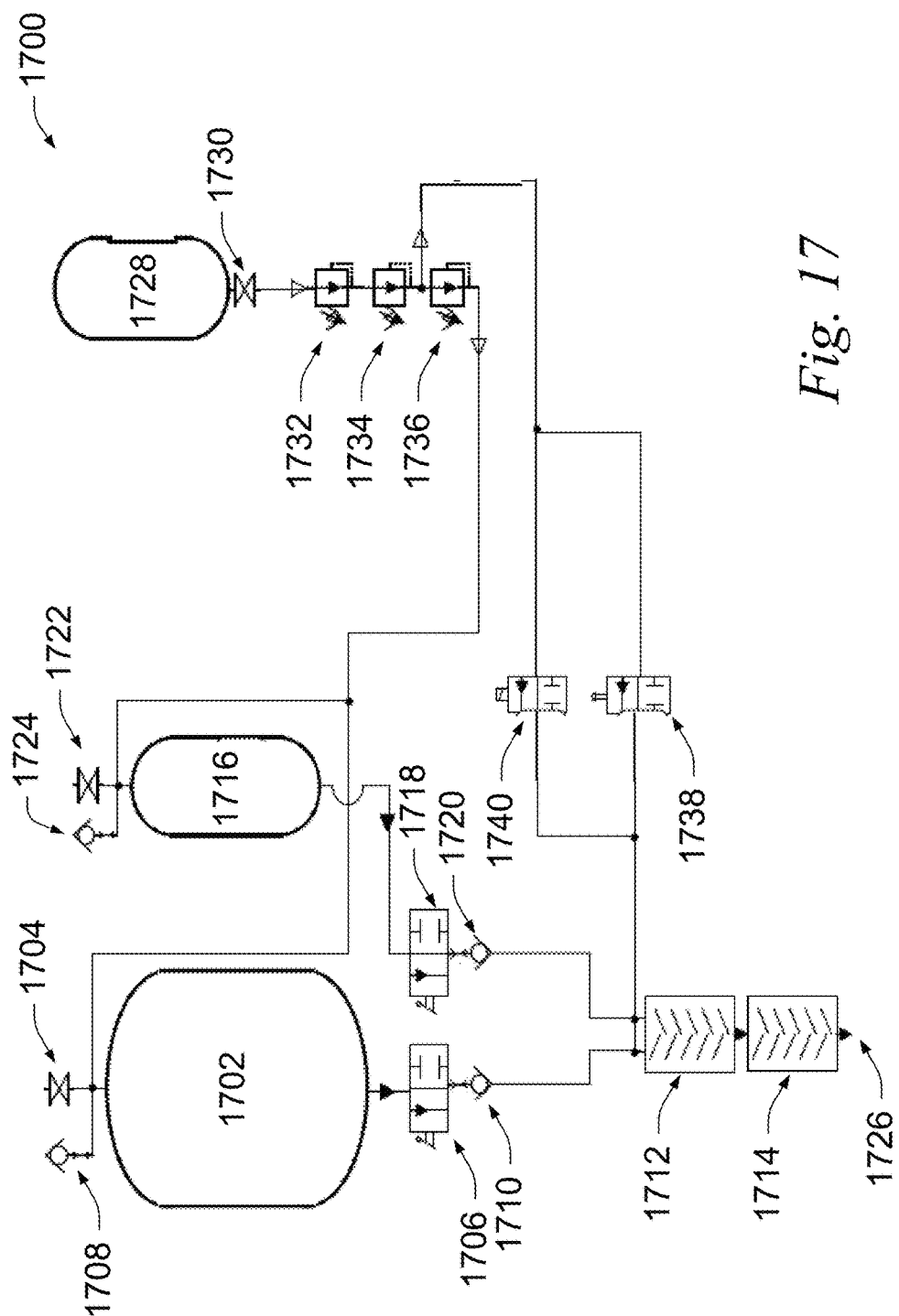
FIG. 17 is a pneumatic/hydraulic schematic for one embodiment of an system for applying Applicant's disarmament resin.

Referring to FIG. 17, a pneumatic/hydraulic schematic 1700 of one embodiment of an applicator for dispensing Applicant's sprayable composition is shown. This embodiment is particularly useful for a backpack-sized applicator. A Part A tank 1702 is in fluid communication with a fill/cut-off valve 1704, a mechanically operated toggle switch 1706, and a pressure relief valve 1708. The mechanically operated toggle switch 1706 is in fluid communication with a check valve 1710, which is in fluid communication with a first static mixing chamber 1712. The Part A tank 1702 contains an aqueous Part A solution. The Part B tank 1716 contains an aqueous Part B solution.

A Part B tank 1716 is in fluid communication with a fill/cut-off valve 1722, a mechanically operated toggle switch 1718, and a pressure relief valve 1724. The mechanically operated toggle switch 1718 is in fluid communication with a check valve 1720, which is in fluid communication with a first static mixing chamber 1712.

The first static mixing chamber 1712 is in fluid communication with a second static mixing chamber 1714. The static mixing chambers 1712 and 1714 ensure thorough mixing of the Part A and Part B components before being broadcast from nozzle 1726. In one embodiment, the second mixing chamber 1714 is omitted and a single mixing chamber 1712 is used.

A source of compressed gas 1728 is in fluid communication with a cut-off valve 1730. In one embodiment, the source of compressed gas 1728 is a compressed air tank containing 48 cubic inches of 3000 psi compressed air. The cut-off value 1730 is in fluid communication with a first pressure regulator 1732. In one embodiment, the first pressure regulator 1732 reduces the pressure from the source of 3000 psi to 100 psi at the outlet of the first pressure regulator 1732. The first pressure regulator 1732 is in fluid communication with a second pressure regulator 1734. In one embodiment, the second pressure regulator 1734 reduces the pressure from the 100 psi to 70 psi at the outlet of the second pressure regulator 1734. The second pressure regulator 1734 is in fluid communication with a third pressure regulator 1736. In one embodiment, the third pressure regulator 1736 reduces the pressure from the 70 psi to 43 psi at the outlet of the third pressure regulator 1736.

The outlet of the second pressure regulator 1734, at a pressure in one embodiment of 70 psi, is in fluid communication with a manually operated valve 1738 and a solenoid operated valve 1740. The manually operated valve 1738 and a solenoid operated valve 1740 are each in fluid communication with both lines entering the first static mixing chamber 1712.

During operation, the valves 1706 and 1718 are opened, allowing the liquid contents of the Part A tank 1702 and the Part B tank 1716 to flow to the first static mixing chamber 1712. The contents of the Part A tank 1702 and the Part B tank 1716 are forced under pressure (about 45 psi, in one embodiment) from the source of compressed gas 1728. The Part A and Part B components are volumetrically mixed in the first static mixing chamber 1712 and further mixed in the second static mixing chamber 1714 before existing the system under pressure at 1726.

Once the valves 1706 and 1718 are closed, stopping the flow of the Part A and Part B components through the static mixing chambers 1712 and 1714, the solenoid value 1740 is electronically triggered allowing a flow of high pressure gas (about 70 psi, in one embodiment) to flush the static mixing heads 1712 and 1714 and the outlet nozzle 1726. The flush can also be manually triggered by the manually operated valve 1738.

In one embodiment, all materials wetted in the system before the mixing of the Part A and Part B components (i.e., upstream from the first mixing chamber 1712, are constructed from polypropylene, nylon 6, high density polyethylene, PVC, PFA or 316L stainless steel. All components wetted at or after the mixing of the Part A and Part B components are constructed from non-metallic materials.

Figure 18:
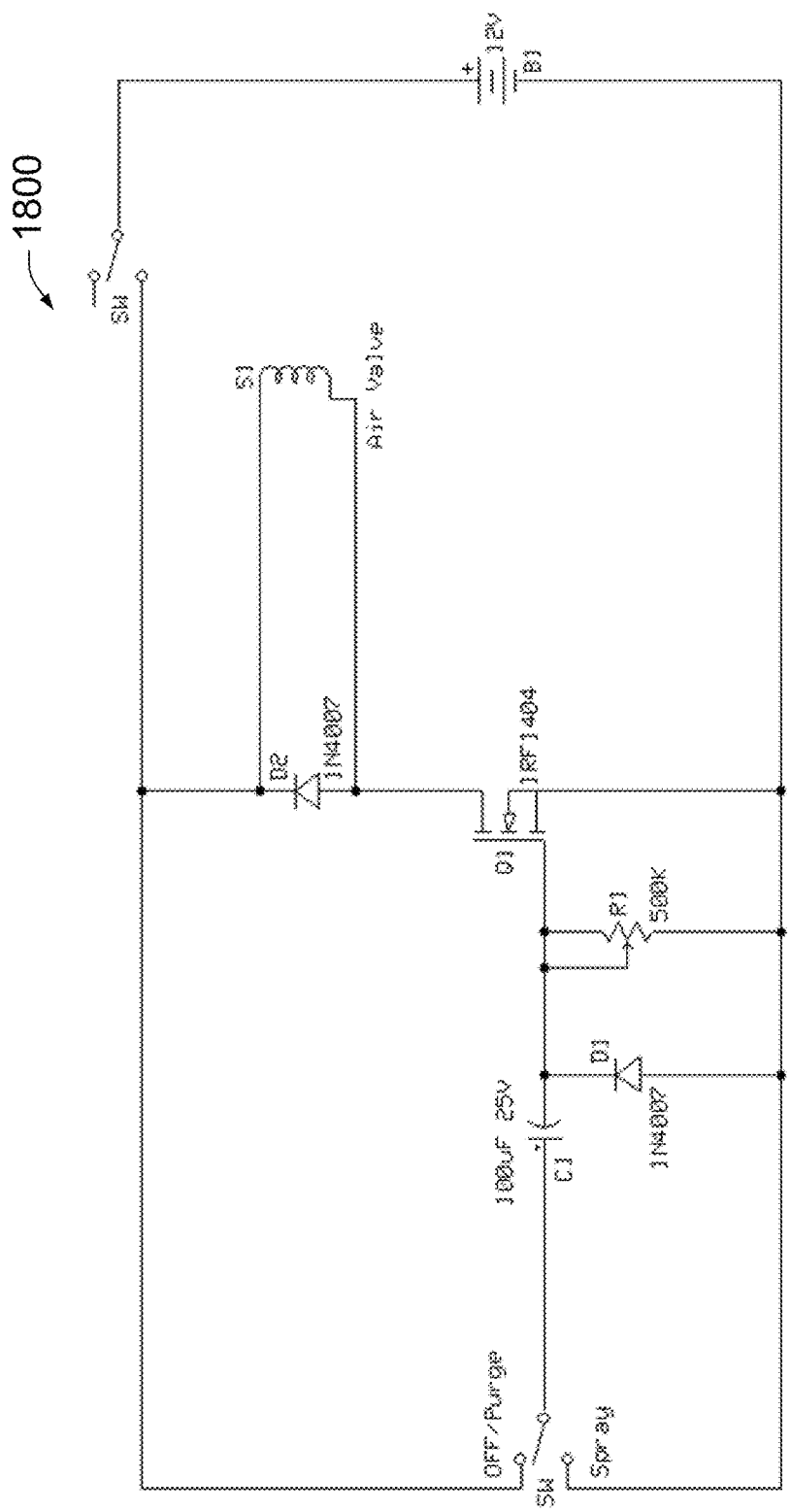
FIG. 18 is an electrical schematic to be used with the applicator in FIG. 17.

Referring to FIG. 18, one embodiment of an electrical schematic 1800 for the system presented in FIG. 17 is shown. As will be appreciated by one having ordinary skill in the art, the electrical schematic 1800 is a standard electrical schematic containing standard electronic components.

Figure 19:
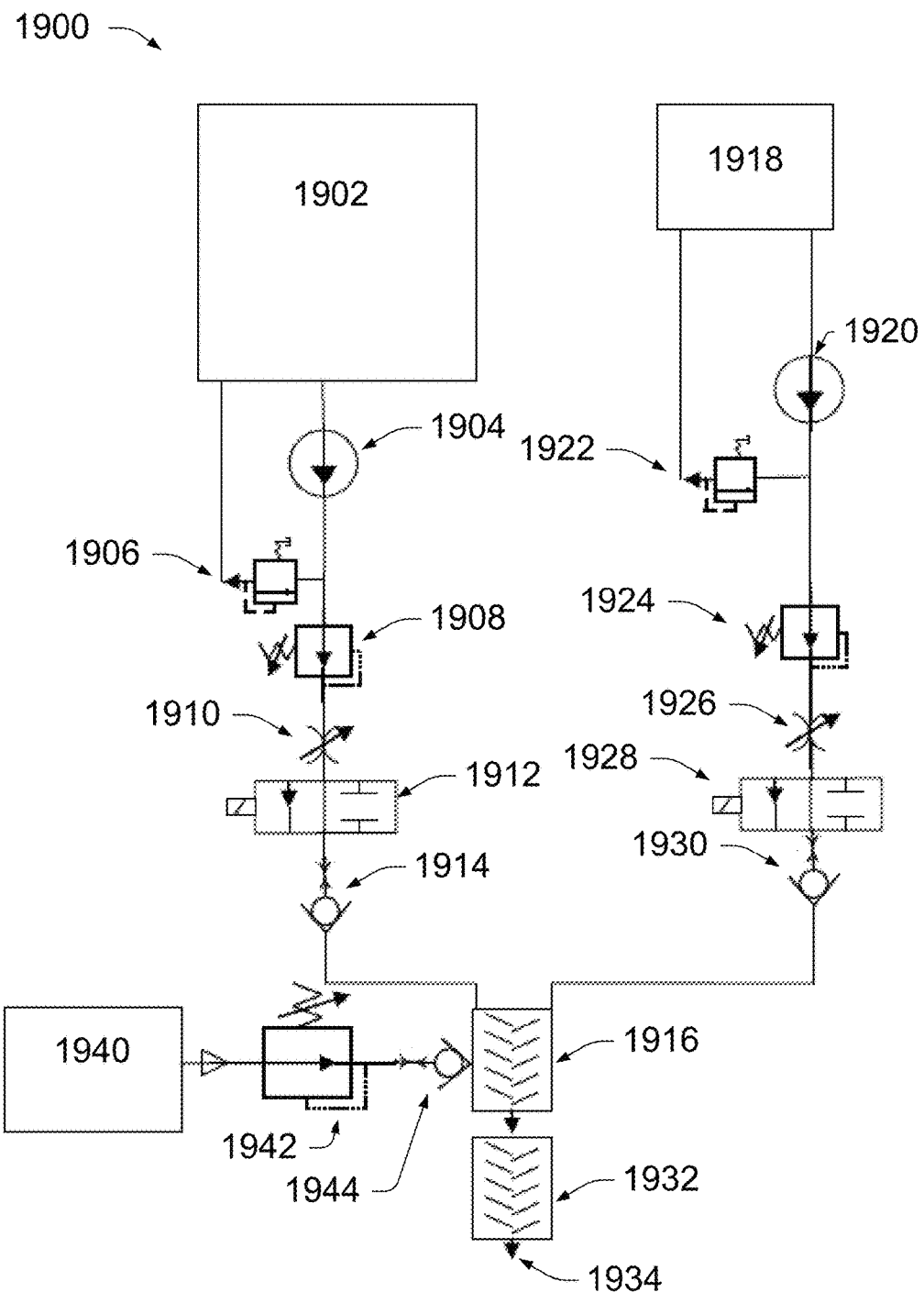
FIG. 19 is a pneumatic/hydraulic schematic for another embodiment of an system for applying Applicant's disarmament resin.
Figure 20:
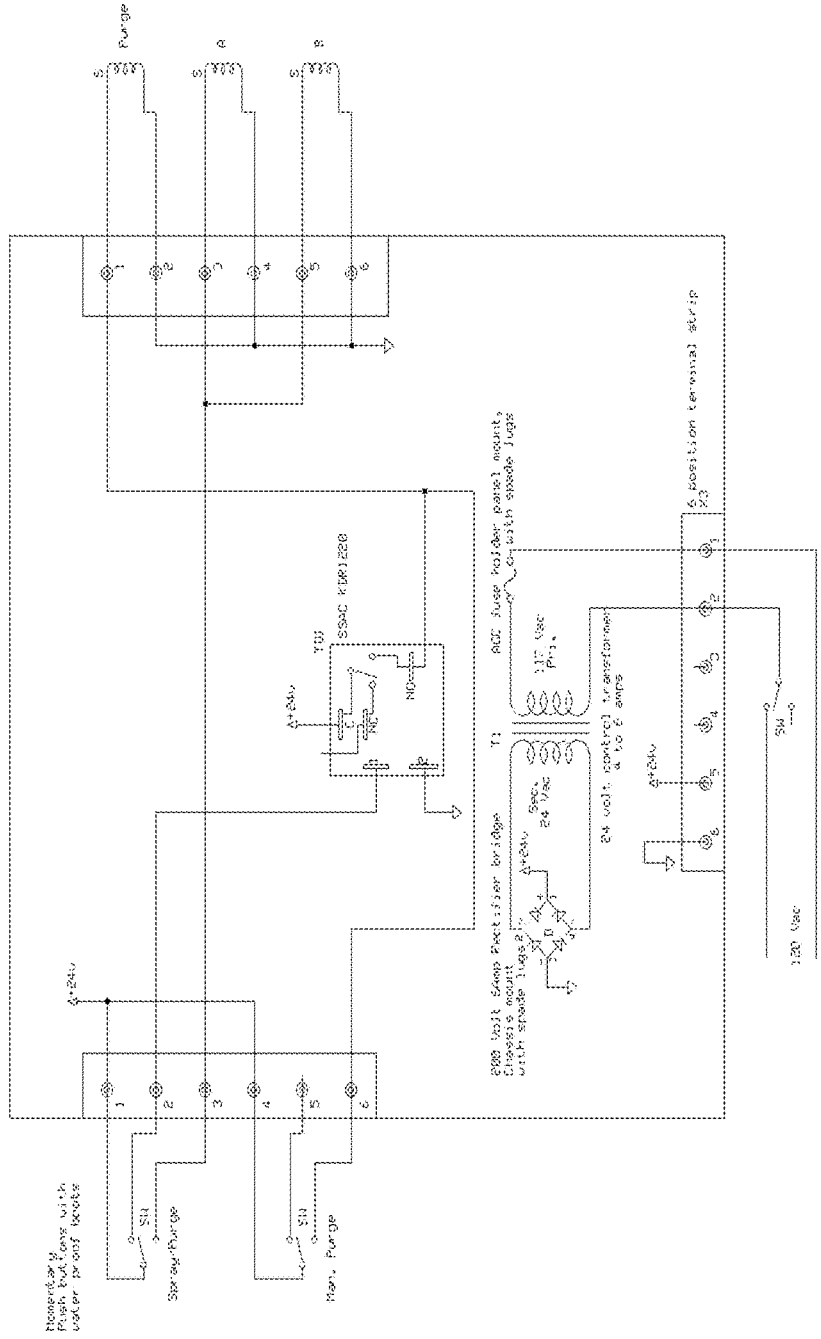
FIG. 20 is an electrical schematic to be used with the applicator in FIG. 19.

Referring to FIG. 19, a pneumatic/hydraulic schematic 1900 of another embodiment of an applicator for dispensing Applicant's sprayable composition is shown. This embodiment is particularly useful for a vehicle-mounted applicator.

A Part A reservoir 1902 is in fluid communication with a displacement pump 1904. The outlet of the displacement pump 1904 is in fluid communication with pressure relief valve 1906 and liquid pressure regulator valve 1908. The pressure relief value 1906 is in fluid communication with the Part A reservoir 1902. The liquid pressure regulator valve 1908 is in fluid communication with a needle valve 1910. The needle value 1910 is in fluid communication with a solenoid operated valve 1912. The solenoid operated value 1912 is in fluid communication with a check valve 1914. The check valve 1914 is in fluid communication with a first static mixing chamber 1916.

A Part B reservoir 1918 is in fluid communication with a displacement pump 1920. The outlet of the displacement pump 1904 is in fluid communication with pressure relief valve 1922 and liquid pressure regulator valve 1924. The pressure relief value 1922 is in fluid communication with the Part B reservoir 1918. The liquid pressure regulator valve 1924 is in fluid communication with a needle valve 1926. The needle value 1926 is in fluid communication with a solenoid operated valve 1928. The solenoid operated value 1928 is in fluid communication with a check valve 1930. The check valve 1930 is in fluid communication with a first with a first static mixing chamber 1916.

A source of compressed gas 1940 is in fluid communication with an adjustable gas pressure regulator valve 1942. In one embodiment, the source of compressed gas 1940 is a gas-powered air compressor providing compressed air at 70 psi. The adjustable gas pressure regulator valve 1942 is in fluid communication with a check valve 1944. The check valve 1944 is in fluid communication with the first static mixing chamber 1934.

The first static mixing chamber 1916 is in fluid communication with a second static mixing chamber 1932. The static mixing chambers 1916 and 1932 ensure thorough mixing of the Part A and Part B components before being broadcast from nozzle 1934. In one embodiment, the second mixing chamber 1932 is omitted and a single mixing chamber 1916 is used.

During operation of a system implementing the schematic 1900, the pump 1904 drives aqueous Part A solution from the Part A reservoir 1902 into the first static mixing chamber 1916 once the valve 1912 is activated. Likewise, the pump 1920 drives the aqueous Part B solution from the Part B reservoir 1918 into the first static mixing chamber 1916 once the valve 1912 is activated. In one embodiment, an electrical switch is used to simultaneously activate valves 1912 and 1928. Once the valves 1912 and 1928 are deactivated and closed, the regulator valve 1942 is activated, allowing pressurized gas from the source of pressurized gas 1940 to flow through the static mixing chambers 1916 and 1932. This flushes and clears the mixing chambers 1916 and 1932 and the outlet nozzle 1934 of all residual Part A/Part B solution.

In one embodiment, all materials wetted in the system before the mixing of the Part A and Part B components (i.e., upstream from the first mixing chamber 1916, are constructed from polypropylene, nylon 6, high density polyethylene, PVC, PFA or 316L stainless steel. All components wetted at or after the mixing of the Part A and Part B components are constructed from non-metallic materials.

Referring to FIG. 20, one embodiment of an electrical schematic 2000 for the system presented in FIG. 19 is shown. As will be appreciated by one having ordinary skill in the art, the electrical schematic 2000 is a standard electrical schematic containing standard electronic components.

While specific values have been recited for the various embodiments recited herein, it is to be understood that, within the scope of the invention, the values of all parameters, including amounts and ratios, may vary over wide ranges to suit different applications.

While the invention is described through the above-described exemplary embodiments, it will be understood by those of ordinary skill in the art that modifications to, and variations of, the illustrated embodiments may be made without departing from the inventive concepts disclosed herein. For example, although some aspects have been described with reference to a flowchart, those skilled in the art should readily appreciate that functions, operations, decisions, etc. of all or a portion of each block, or a combination of blocks, of the flowchart may be combined, separated into separate operations or performed in other orders. In addition, although a composition for promoting the accelerated degradation has been described in relation to small arms, electronics, and vehicles, the disclosed methods and formulations may be used for other purposes, including the production of hydrogen for use in, for example, fuel cells. Similarly, although a system and method for applying Applicant's composition has been described, the disclosed system and method may be used for other purposes. Furthermore, disclosed aspects, or portions of these aspects, may be combined in ways not listed above. Accordingly, the invention should not be viewed as being limited to the disclosed embodiment(s).

What is claimed is:

1. A method of making a composition to decommission firearms, comprising combining:
a monomer comprising 2-acrylamido-2-methylpropane sulfonic acid sodium salt at between about 20 weight percent to about 47 weight percent of the composition;
a quantity of calcium chloride; and
a sulfur-containing compound selected from the group consisting of sodium persulfate, sodium thiosulfate, and combinations thereof, wherein the sulfur-containing compound catalyzes the polymerization of said monomer;
a cross-linking agent comprising N-N' methylenebisacrylamide;
wherein:
said N-N' methylenebisacrylamide at between about 0.5 dry weight percent to about 1 dry weight percent of the composition;
said quantity of calcium chloride at between about 20 dry weight percent to about 45 dry weight percent of the composition;
said sodium thiosulfate at between about 10 dry weight percent to about 15 dry weight percent of the composition; and
said sodium persulfate at between about 15 dry weight percent to about 20 dry weight percent of the composition.

2. The method of claim 1, further comprising adding water at between about 50 weight percent and 75 weight percent of an aqueous mixture.

3. The method of claim 1, wherein the monomer comprises a melamine-glyoxal-acrylamide condensate product.

4. The method of claim 3, wherein:
the melamine-glyoxal-acrylamide condensate product at between about 40 dry weight percent to about 60 dry weight percent of the composition of claim 3;
the quantity of calcium chloride at between about 10 dry weight percent to about 20 dry weight percent of the composition of claim 3;
the sodium thiosulfate at between about 5 dry weight percent to about 15 dry weight percent of the composition of claim 3; and
the sodium persulfate at between about 20 dry weight percent to about 30 dry weight percent of the composition of claim 3.

5. The method of claim 4, further comprising adding water at about 50-75 weight percent of an aqueous mixture.

6. The method of claim 1, wherein the monomer comprises a melamine-glyoxal-acrylamide condensate product in combination with 2-acrylamido-2-methylpropane sulfonic acid sodium salt.

7. The method of claim 6, wherein:
the melamine-glyoxal-acrylamide condensate product at between about 20 dry weight percent to about 30 dry weight percent of the composition of claim 6;
the 2-acrylamido-2-methylpropane sulfonic acid sodium salt at between about 10 dry weight percent to about 20 dry weight percent of the composition of claim 6;
the quantity of calcium chloride at between about 30 dry weight percent to about 40 dry weight percent of the composition of claim 6;
the sodium thiosulfate at between about 8 dry weight percent to about 20 dry weight percent of the composition of claim 6; and
the sodium persulfate at between about 10 dry weight percent to about 22 dry weight percent of the composition of claim 6.

8. The method of claim 7, further comprising adding water at about 50-75 weight percent of an aqueous mixture.

9. The method of claim 1, further comprising adding a galvanic current enhancer selected from the group consisting of copper powder and graphic powder.

10. A method of making a foaming composition to render electrical components inoperable, comprising:
combining:
a foaming agent;
a corrosion promoter; and
a sulfur-containing compound to poison the recombination of atomic hydrogen to molecular hydrogen;
wherein:
the foaming agent comprises cocamidopropyl betaine;
the corrosion promoter comprises sodium chloride and methyldiethanol amine; and
the sulfur-containing compound comprises sodium persulfate.

11. The method of claim 10, wherein:
the sodium chloride at between about 18 dry weight percent to about 30 dry weight percent of the composition of claim 10;
the methyldiethanol amine at between about 15 dry weight percent to about 30 dry weight percent of the composition of claim 10;
the cocamidopropyl betaine at between about 10 dry weight percent to about 20 dry weight percent of the composition of claim 10; and
the sodium persulfate at between about 35 dry weight percent to about 45 dry weight percent of the composition of claim 10.

12. The method of claim 11, further comprising adding water at about 50-75 weight percent of an aqueous mixture.

13. The method of claim 10, wherein:
the foaming agent comprises a surfactant selected from the group consisting of:
schercotain scab-50 betaine amphoteric, chembetain cas, and chembetaine lhs;
the corrosion promoter comprises sodium chloride and a component selected from the group consisting of methyldiethanol amine and sodium thiosulfate; and
the sulfur-containing compound comprises sodium persulfate.

* * * * *